US009830561B2

(12) United States Patent
Renaudie et al.

(10) Patent No.: US 9,830,561 B2
(45) Date of Patent: Nov. 28, 2017

(54) VISUAL BOOKING SYSTEM

(71) Applicant: Amadeus S.A.S., Sophia Antipolis (FR)

(72) Inventors: David Renaudie, Biot (FR); Nicolas Hauviller, Valbonne (FR); Francois Montegut, Nice (FR)

(73) Assignee: Amadeus S.A.S., Biot (FR)

( * ) Notice: Subject to any disclaimer, the term of this patent is extended or adjusted under 35 U.S.C. 154(b) by 796 days.

(21) Appl. No.: 14/266,122

(22) Filed: Apr. 30, 2014

(65) Prior Publication Data

US 2015/0317569 A1    Nov. 5, 2015

(51) Int. Cl.
| G06Q 10/02 | (2012.01) |
| G06K 9/32 | (2006.01) |
| G06K 9/62 | (2006.01) |
| G06K 9/00 | (2006.01) |
| G06Q 50/14 | (2012.01) |

(52) U.S. Cl.
CPC ......... *G06Q 10/02* (2013.01); *G06K 9/00463* (2013.01); *G06K 9/00671* (2013.01); *G06K 9/325* (2013.01); *G06K 9/6267* (2013.01); *G06Q 50/14* (2013.01); *G06K 2209/01* (2013.01)

(58) Field of Classification Search
CPC .... G06Q 10/02; G06Q 50/14; G06K 9/00463; G06K 9/00671; G06K 9/325; G06K 9/6267; G06K 2209/01
See application file for complete search history.

(56) References Cited

U.S. PATENT DOCUMENTS

| 7,962,128 | B2 | 6/2011 | Neven et al. | |
| 8,131,118 | B1* | 3/2012 | Jing | G01C 21/20 382/305 |
| 8,805,828 | B1* | 8/2014 | Ngo | G06F 17/30528 707/723 |
| 8,819,053 | B1* | 8/2014 | Funaro | G06Q 50/14 707/767 |
| 2010/0331043 | A1 | 12/2010 | Chapman et al. | |
| 2011/0071757 | A1 | 3/2011 | Lee et al. | |

(Continued)

FOREIGN PATENT DOCUMENTS

KR    20120019158 A    3/2012

OTHER PUBLICATIONS

Lechner, Martin. "A proposed step-by-step guide to an AR standard." Wikitude GmbH (2011).*

(Continued)

*Primary Examiner* — Daniel Vetter
*Assistant Examiner* — Scott Tungate
(74) *Attorney, Agent, or Firm* — Thompson Hine LLP

(57) ABSTRACT

A method, apparatus, and program product implement visual booking operations to search for travel products and/or present travel recommendations associated with travel products to users based upon visual elements in one or more digital images captured by a wearable or mobile device. Visual elements may be extracted and inferred to identify one or more travel destination locations that are geographically remote from a current location of a user, and the identified travel destination locations may be used to search a travel database to identify at least one travel product for travel from a travel origination location to a travel destination location.

29 Claims, 11 Drawing Sheets

(56) References Cited

U.S. PATENT DOCUMENTS

2013/0011062 A1* 1/2013 Conwell .......... G06F 17/30265
                                                              382/173
2013/0057585 A1   3/2013 Ahmad Athsani et al.
2013/0336520 A1  12/2013 Vanhoucke et al.
2015/0193803 A1* 7/2015 Zamer ................ G06Q 30/0238
                                                              705/14.23

OTHER PUBLICATIONS

European Patent Office, Search Report and Written Opinion issued in corresponding Application No. 14290127.1, 7 pages.
International Searching Authority, International Search Report and Written Opinion issued in corresponding Application No. PCT/EP2015/000654 dated Aug. 26, 2015, 12 pages.
European Patent Office, European Search Report issued in Application No. 14290127.1 dated Aug. 28, 2014.
Silicon Republic Knowledge & Events Management Ltd, "Snap2Travel using image recognition" http://www.siliconerepublic.com/start-ups/item/16648-snap2travel-using-image-rec, Jun. 18, 2010.
"Snap2Travel—A simple tool for travel agents to build customer loyalty and retention" http://snap2travel.wearesuperfantastic.com, May 25, 2013.

* cited by examiner

VISUAL BOOKING SYSTEM

FIELD OF THE INVENTION

The invention is generally related to computers and computer software, and in particular, to travel-related computer software and systems.

BACKGROUND OF THE INVENTION

Computer technology is increasingly used by travelers to make traveling less difficult and more efficient. Automated booking systems, for example, enable travelers to view prices and schedules for passenger vehicles such as airplanes, buses, trains, subways, ferries, cruise ships, etc., as well as purchase tickets for such vehicles when a suitable match is found. Traditionally, such automated booking systems are based on a text and/or graphical user interface in which a user performs a search by manually inputting information such as origin, destination, travel dates, and types of travel products desired (e.g., air travel, train travel, hotel reservations, car rentals, etc.), and receives in return a listing of matching travel products and associated prices from which the user may select and complete a booking.

Human-machine interface technologies are also constantly evolving, resulting, for example, in widespread adoption of hand-held technologies such as tactile mobile phones and tablets that rely on touchscreen and/or voice interfaces rather than a keyboard and/or mouse. Furthermore, increased focus has been placed on wearable technologies such as smart watches, smart glasses, and fitness trackers, and it is anticipated that these and other wearable technologies will increasingly be adopted by individuals and used for many of the same purposes as mobile phones and tablets, not to mention the computers that preceded such hand-held technologies. It is anticipated, for example, that both hand-held and wearable technologies will be increasingly used in connection with travel-related applications.

SUMMARY OF THE INVENTION

The invention addresses these and other problems associated with the prior art by providing in one aspect a method, apparatus, and program product that implement visual booking operations to search for travel products and/or present travel recommendations associated with travel products to users based upon visual elements in one or more digital images captured by a wearable or mobile device. Visual elements may be extracted and inferred in some embodiments, for example, to identify one or more travel destination locations that are geographically remote from a current location of a user, and the identified travel destination locations may be used to search a travel database to identify at least one travel product for travel from a travel origination location to a travel destination location.

Therefore, consistent with one aspect of the invention, a travel product may be searched for by receiving a digital image; using at least one processing resource, analyzing a plurality of visual elements in the digital image to identify at least one travel destination location that is geographically remote from a current location of a user; and searching a travel database to identify at least one travel product for travel from a travel origination location to the travel destination location.

Consistent with another aspect of the invention, a travel product may be suggested to a user by receiving digital images from a stream of digital images captured by a wearable image capture device while being worn by the user, analyzing a plurality of visual elements in at least one of the received digital images to identify at least one travel destination location that is geographically remote from a current location of the user, searching a travel database to identify at least one travel product for travel to the travel destination location, and causing the wearable image capture device to present an unsolicited recommendation associated with the at least one travel product to the user.

Consistent with yet another aspect of the invention, a travel product may be suggested to a user by receiving digital images from a stream of digital images captured by a wearable image capture device while being worn by the user, where the wearable image capture device is switchable between continuous and on-demand modes, analyzing visual elements in at least one of the received digital images from the stream to identify at least one first travel destination location that is geographically remote from a current location of the user, searching a travel database to identify at least one travel product for travel to the travel destination location, and causing the wearable image capture device to present a travel recommendation associated with the first travel product to the user, where when the wearable image capture device is in the on-demand mode, the travel recommendation is presented only at user request, and where when the wearable image capture device is in the continuous mode, the travel recommendation is an unsolicited recommendation.

The invention also addresses additional problems associated with the prior art by providing in another aspect a method, apparatus, and program product that analyze "visual bookmarks" that a user has effectively created by capturing images associated with travel offers in which the user has an interest. Through analysis operations similar to that which may be performed in connection with the aforementioned visual booking operations, travel offers may be identified and returned to a user for further action, e.g., completing a booking for a travel offer.

Consistent with this other aspect of the invention, a travel offer may be searched by analyzing a plurality of digital images captured by a user device to identify at least one digital image captured as a visual bookmark for a travel offer, including, for the identified digital image, analyzing a plurality of visual elements in the identified digital image to identify a travel destination location that is geographically remote from a location at which such digital image is captured, where the travel offer is associated with the travel destination location, searching a database to identify the travel offer based upon analyzing the plurality of visual elements in the identified digital image, and presenting to the user a travel recommendation associated with the travel offer.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
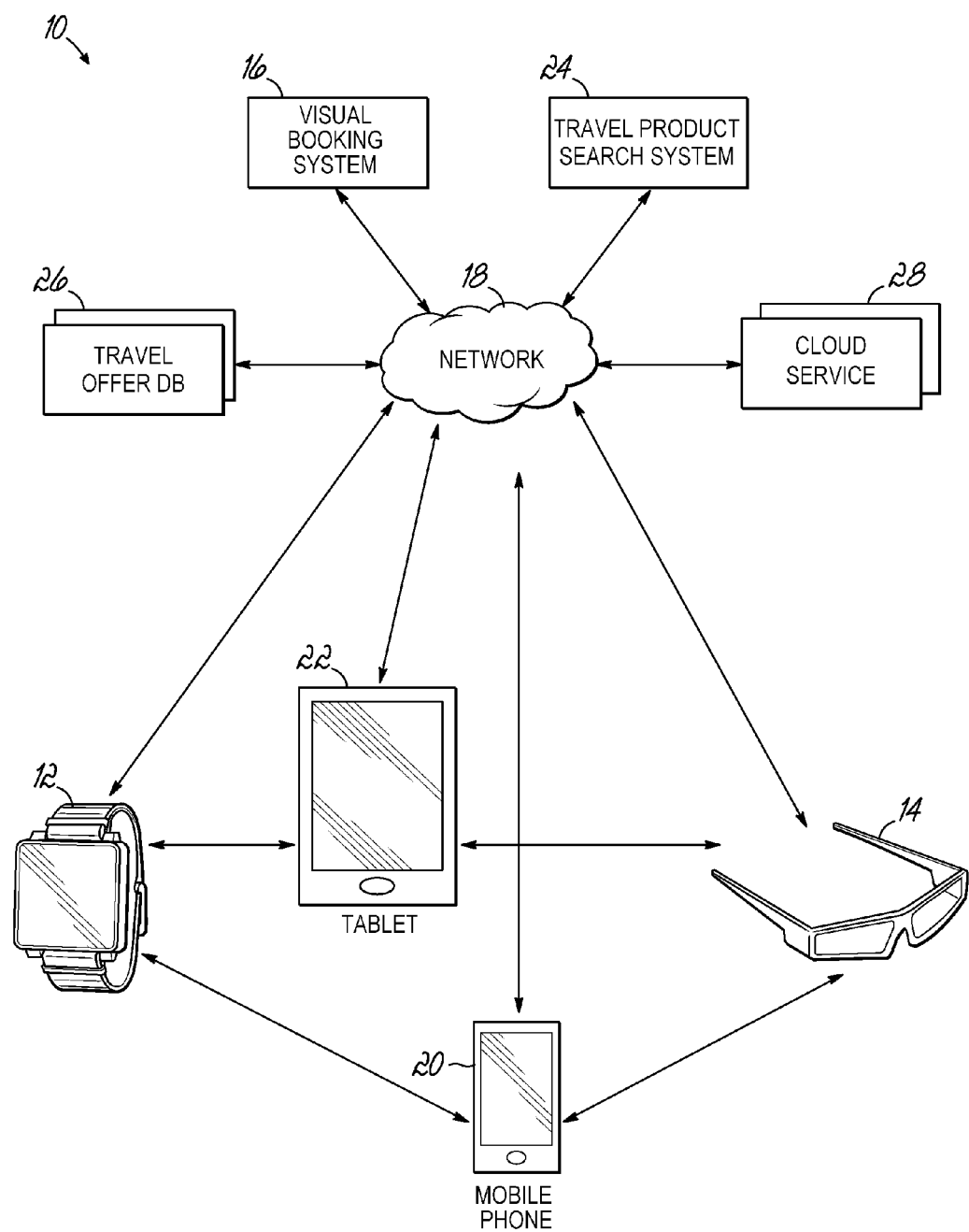
FIG. 1 is a schematic illustration of an example visual booking system consistent with the invention.

Embodiments consistent with the invention are generally directed to visual booking operations that may be used to search for travel products and/or present travel recommendations associated with travel products, based upon visual elements in one or more digital images captured by a wearable or mobile device. In the embodiments discussed herein, visual elements in one or more digital images are analyzed to identify one or more travel destination locations that are geographically remote from a current location of a user, and the one or more identified travel destination locations are used to search a travel database to identify at least one travel product for travel from a travel origination location to a travel destination location.

A travel product, more generally, may include various types of goods and/or services associated with the travel industry, including, for example, air travel, train travel, ship travel, cruises, ferries, bus travel, space travel, etc. Travel products may also include hotel or other lodging reservations, car rentals, meals, drinks, event tickets, and other travel-related goods and services. It will be appreciated, however, that in many of the illustrated embodiments, while multiple travel types of products may be packaged together into travel offers or packages, the visual booking operations disclosed herein identify at least one travel product that may be used to travel between two geographical locations, i.e., to travel from a travel origination location to a travel destination location. As such, in these illustrated embodiments, while a user may be presented with travel recommendations related to hotels, event tickets, car rentals, etc., such recommendations will be accompanied by some travel product associated with the actual travel between two geographic locations, e.g., one or more flights.

Furthermore, the travel destination locations that are identified are generally geographically remote from a current location of a user. Thus, if a user is standing in front of the Eiffel Tower, and the Eiffel Tower is identified by a wearable device worn by the user, a visual booking operation consistent with the invention would not suggest to the user a roundtrip flight to Paris.

A travel recommendation, as used herein, may be considered to include product, marketing and/or other information associated one or more travel products, whether configured as individual travel products or packaged together into multi-product packages or offers, and whether the user ultimately completes a booking or otherwise performs additional actions based upon the travel recommendation. A travel recommendation may also be considered to be interchangeable with a search result or suggestion that is returned to a user in response to a travel-related search.

As such, embodiments consistent with the invention may be able to search for travel-oriented content based upon visual analysis of captured images. Further, due to the domain-specific nature of the search, generally the search may be performed with greater accuracy and efficiency than would otherwise be required for more general visual or image analysis. In addition, as will become more apparent below, analysis techniques such as zoning, surface ratio and geographical hierarchy reinforcement, relevant travel destination locations may be readily identified and used to perform effectively a travel-related search. In addition, in some embodiments, both on-request and continuous modes may be supported to enable a user, when desired, to receive travel recommendations without having to consciously request such recommendations. Furthermore, in some embodiments, a user may be permitted to switch between devices, e.g., from a wearable device to an associated mobile device, to transition a shopping flow to a device better suited for completing the flow, e.g., to complete a purchase by entering user and credit card information or other online payment methods (e.g., PayPal, etc.) to complete a booking, which might otherwise be difficult to accomplish via a wearable device.

Other variations and modifications will be apparent to one of ordinary skill in the art.

Hardware and Software Environment

Turning now to the drawings, wherein like numbers denote like parts throughout the several views, FIG. 1 illustrates an example data processing system 10 in which a visual booking operation may be implemented consistent with the invention. System 10 is illustrated as including one or more wearable devices, e.g., a smart watch 12 and a pair of smart glasses 14, through which a visual booking operation may be initiated through interaction with a visual booking system 16 over a network 18, e.g., the Internet. Additional associated devices, e.g., mobile devices such as a mobile phone or smartphone 20 and a tablet computer 22, may also be present in system 10, and may be used in some embodiments to initiate visual booking operations consistent with the invention, either in connection with a wearable device, or alternatively, without any associated wearable device. For example, a smartphone or tablet computer including an image capture device may be considered to be a form of handheld image capture device.

In general, embodiments consistent with the invention may be implemented at least in part within an innumerable number of types of electronic devices, including wearable devices such as smart glasses, smart watches, fitness bands, implantable devices, and other types of electronic devices capable of being worn or carried on a user's person without necessarily being held by the user and incorporating image capture functionality, as well as other mobile devices such as smart phones, tablet computers, cell phones, digital cameras, media players, or other types of electronic devices capable of being held by a user. In addition, such devices may be integrated in some embodiments into shoes, hats, clothing and other items capable of being worn by a user. Therefore, the invention is not limited to the particular electronic devices discussed herein.

Network 18 may include one or more networks incorporating one or more different networking technologies. As noted above, for example, network 18 may include the Internet or other public wide area network. Network 18 may also include service provider networks, e.g., mobile carrier networks, Wi-Fi networks, local-area networks, private networks, other public networks, etc. In addition, network 18 may include networks available via various networking technologies, including wired or wireless Ethernet, Bluetooth, Bluetooth LE, personal-area-networks, near field communication (NFC), and any other suitable wireless or wired networking technology. Further, as illustrated in FIG. 1, devices 12, 14, 20 and/or 22 may also communicate directly with one another via any of the aforementioned networking techniques.

Each device 12, 14, 20, 22, as noted above, may be in communication with visual booking system 16 to perform any or all of the activities associated with a visual booking operation. In addition, devices 12, 14, 20, 22, and/or visual booking system 16, may access additional services, e.g., a travel product search system 24, one or more travel offer databases 26, and/or one or more cloud computing services 28. In addition, one or more of systems or services 16, 24, 26 and 28 may be combined in some embodiments, or the functionality thereof may be distributed among additional systems and/or services.

Figure 2:
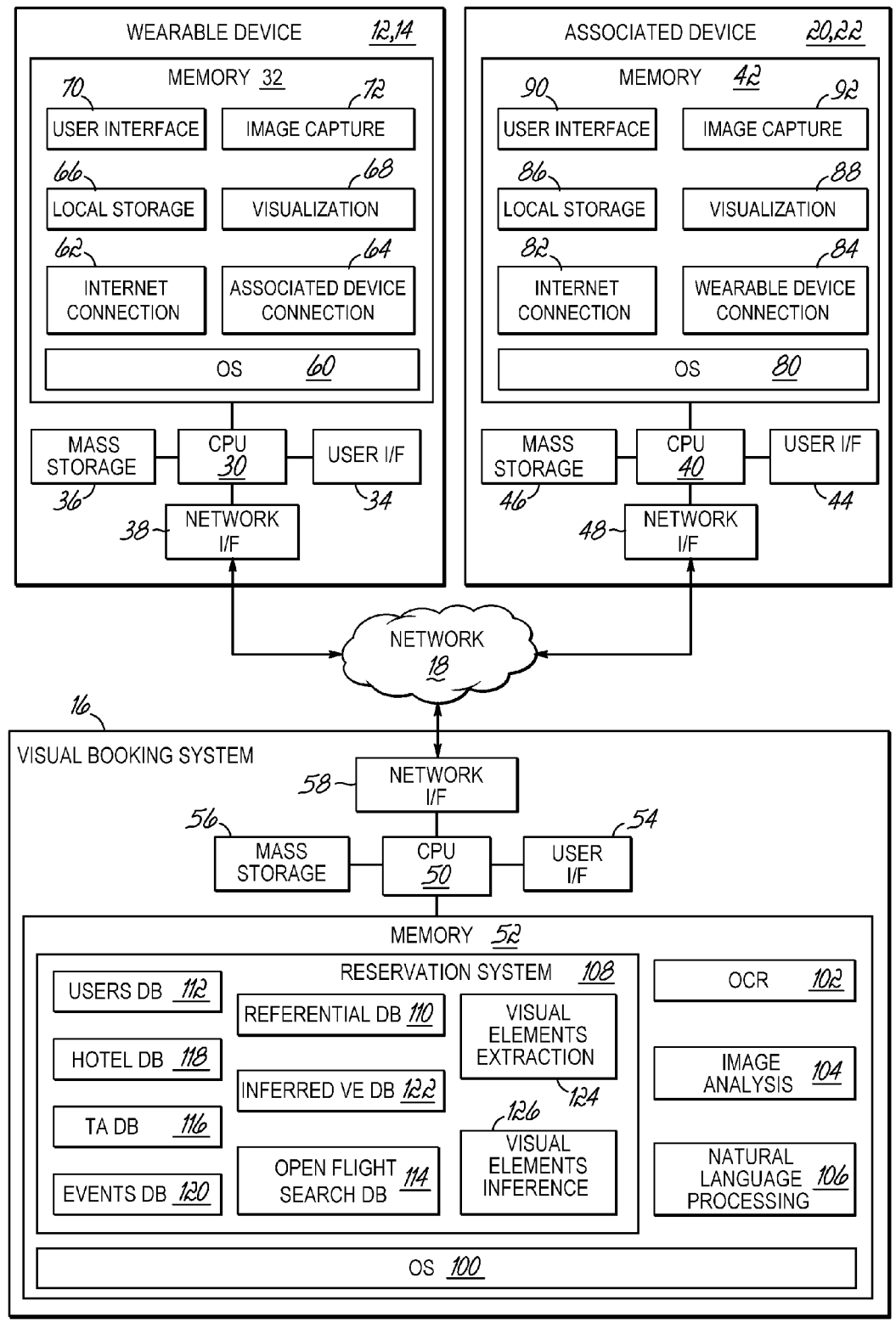
FIG. 2 is a block diagram of an example hardware and software implementation of the system of FIG. 1.

As illustrated in FIG. 2, each wearable device 12, 14 and each mobile device 20, 22 may include a central processing unit 30, 40 including one or more processing resources, e.g., one or more microprocessors coupled to a memory 32, 42, which may represent the random access memory (RAM) devices comprising the main storage of the device, as well as any supplemental levels of memory, e.g., cache memories, non-volatile or backup memories (e.g., programmable or flash memories), read-only memories, etc.

A processing resource within the context of the invention is at least partially implemented in physical hardware and may be considered in different embodiments to include a microprocessor, a microcontroller, an FPGA, a processing core within a microprocessor, a plurality of microprocessors, a computer, a plurality of computers, a subset of the logic circuitry within any of the aforementioned devices, or practically any other hardware-implemented logic circuitry capable of executing instructions or otherwise implementing the computer-based functionality disclosed herein. In addition, memory 32, 42 may be considered to include memory storage physically located elsewhere in the device, e.g., any cache memory in a microprocessor, as well as any storage capacity used as a virtual memory, e.g., as stored on a mass storage device or on another computer coupled to the mobile device.

Each device also typically receives a number of inputs and outputs for communicating information externally. For interface with a user or operator, the device typically includes a user interface 34, 44 incorporating one or more user input devices, e.g., a keyboard, a touchscreen, hard buttons, a display, etc., depending upon the type of device. For example, for a pair of smart glasses, the user interface may include an image capture device such as a digital camera, an audio capture device such as a microphone, a visual display such as a heads-up or augmented reality display, and an audio playback device such as a speaker or earphone. Likewise, for a smart watch, the user interface may include one or more hard buttons, a touch screen, a microphone, a speaker, an image capture device, etc. For other types of wearable devices, the user interface may include other types of user interface components, e.g., smart contact lenses, virtual retinal displays, etc. For a mobile device, the user interface may include a touch screen, a microphone, a speaker and/or audio jack, one or more hard buttons, etc. In addition, various other sensors, e.g., accelerometers, gyroscopes, geolocation sensors (e.g., GPS sensors), etc., may provide additional input to a device.

Each device also may be in communication with one or more mass storage devices 36, 46, which may be, for example, internal flash memories, internal hard disk storage devices, external storage devices, network storage, etc. Each device also includes one or more network interfaces 38, 48 for connecting to a mobile network such as network 18, as well as other networks, as well as other devices, e.g., over a short range wireless network such as Wi-Fi, Bluetooth, Bluetooth LE, NFC, etc.

Likewise, visual booking system 16 (as well as other systems and services illustrated in FIG. 1) may include a central processing unit 50, memory 52, user interface 54, mass storage device 56, and network interface 58, albeit generally incorporating higher performance components that are generally used for server-type computers. It will be appreciated that visual booking system 16 may be implemented using high performance computing technologies such as clustering, networked storage, parallelism, fault tolerance, distributed computing, etc.

Each device 12, 14, 20, 22, as well as visual booking system 16, generally operates under the control of an operating system 60, 80, 100, and executes or otherwise relies upon various computer software applications, components, programs, objects, modules, data structures, etc., as will be described in greater detail below, including, for example, components or modules 62-72, 82-90, and 102-126 of FIG. 2. Moreover, various applications, components, programs, objects, modules, etc. may also execute on one or more processors or using one or more processing resources in another computer coupled to a computer system or mobile device via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium that can be used to store the desired information and which can be accessed by a computer and/or mobile device. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

It will be appreciated that the terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising." In addition, it will be appreciated that the operations represented by blocks of any flowcharts included herein may be reorganized, performed concurrently, and/or sequentially in any order, and that some operations may be combined, reordered, omitted, and/or supplemented with other techniques known in the art.

Those skilled in the art will recognize that the example environment illustrated in FIGS. 1 and 2 is not intended to limit the present invention. Indeed, those skilled in the art will recognize that other alternative hardware and/or software environments may be used without departing from the scope of the invention.

Visual Booking Operation

In the embodiment discussed hereinafter, a visual booking system or service is provided to facilitate the provision of travel-related products and/or services to users of wearable and/or mobile devices. As noted above, the unique characteristics of wearable devices, and to some extent, mobile devices, present challenges to users when interacting with travel-related systems and services using traditional user interfaces. Activities such as searching for travel products, booking travel products, receiving travel offers, etc., have traditionally relied on a computer-centric interface requiring large displays and dedicated user input devices such as keyboards and pointing devices. In contrast, the visual book system described herein facilitates interaction with a travel-related system or service using wearable and/or mobile devices based at least in part on analysis of images captured by such devices.

In the embodiment discussed hereinafter, an example scenarios are presented of a user wearing a wearable device such as a pair of smart glasses, and optionally additionally relying on a mobile device such as a smart phone or tablet in communication with the smart glasses. When a mobile device is used in conjunction with a wearable device, that mobile device may additionally be referred to herein as an associated device. It will be appreciated by those of skill in the art that the invention is not limited to these specific scenarios, and therefore, the invention may apply to other scenarios and may be used with electronic devices other than the types explicitly discussed herein.

Discussed below are three example scenarios. The first operates on an on-request or on-demand basis, the second operates on a continuous basis, and the third operates on a background basis. A full system architecture for implementing the first scenario, which may also be used in connection with the other scenarios with little or no modification, is described first below.

On-Request Suggestion Engine

Returning to FIG. 1, it is assumed for this scenario that a user owns and wears a wearable device such as a smart watch 12 or a pair of smart glasses 14 connected to visual booking system 16 through a network 18 such as the Internet, either directly, e.g., through a carrier or Wi-Fi network, or indirectly, e.g., through a short range Bluetooth, Bluetooth LE or Wi-Fi connection to an associated mobile device such as a smart phone 20 or tablet 22 that is itself connected to the network. User interaction with visual booking system 16 may occur through wearable device 12, 14 and/or through the associated mobile device 20, 22.

Returning to FIG. 2, various software and/or hardware-implemented functional modules are illustrated for wearable device 12, 14, associated mobile device 20,22, and visual booking system 16. For example, wearable device 12, 14 may include a number of modules 62-70 resident on the device and configured to interface with a user as well as with the visual booking system and/or associated mobile device.

An optional Internet connection module 62 may be used to enable the wearable device to connect directly to the Internet (e.g., using wave signal technologies such as GSM, GPRS, Bluetooth, Bluetooth LE, Wi-Fi, etc.) without any associated device. An optional associated device connection module 64 may be used to enable the wearable device to connect to an associated mobile device 20, 22, e.g., to provide indirect Internet access or to distribute visual booking functionality between the two devices. In some embodiments, the wearable device's associated device connection module may use a local wave signal connection, e.g., a Bluetooth, Bluetooth LE or Wi-Fi connection, to communicate with an associated mobile device.

A local storage module 66 may be used to provide local storage of data used in connection with visual booking, e.g., copies of captured images, associated metadata, search results, user preferences, travel offers, bookmarks, etc. An optional visualization module 68 may be used to interact with a visual display for the device, e.g., a heads-up or augmented reality display in the case of smart glasses or a watch face in the case of a smart watch. A user interface module 70 may be used to interact with a user to receive user input, e.g., through a touch surface, one or more physical buttons, a microphone, a speaker, etc. In addition, an image capture module 72 utilizes an image capture device to capture digital images, which may, in some embodiments, include still images and/or digital video clips. In the case of smart glasses, for example, the captured images may be taken from the perspective of the user's view.

Similarly, for the associated mobile device 20, 22, an Internet connection module 82 provides an interface with the Internet, while a wearable device connection module 84 provides an interface with a wearable device 12, 14, e.g., through the complementary associated device connection module 64. Similar local storage 86, visualization 88, user interface 90 and image capture 92 modules may also be provided, albeit adapted for the particular configuration of the associated mobile device, e.g., generally including a touchscreen display through which a majority of the user interactions occur.

Visual booking system 16 also includes a number of hardware and/or software-implemented modules for implementing the herein-described functionality. For example, an optical character recognition (OCR) module 102 may be used to extract textual elements from image data, while an image analysis module 104 may be used to identify visual elements in image data, e.g., using known image recognition techniques. A natural language processing module 106 may be used to extract from textual elements various structured data such as types of events, dates or date ranges, locations, travel providers, travel offers, travel products, etc.

In addition, a number of additional modules may be implemented within a reservation system 108. For example, a number of databases 102-122 may be maintained within and/or accessed by reservation system 108. A referential database 110 may be used to store a predefined list of places, e.g., based on International Air Transport Association (IATA) points of interests, and which are available for booking. A users (profile) database 112 may be used to store profile information for various users, and may be used, for example, to obtain a particular user's preferred origination location (e.g., the user's home airport), as well as other user preferences to be used when searching for travel products.

An open flight search database 114 may be used to store a list of supported origination cities for an open flight search, while a travel agency (TA) database 116 may be used to store information such as a list of travel agencies offering travel products related to a destination location, including agency information such as geolocation data, address information, contact information, etc., which may be used, for example, to direct a user to a closest "physical" travel agency. A hotel database 118 and events database 120 may be used to store hotel and event data related to bookable hotels and events that may be combined with a flight or other form of travel and offered to the user as a package, a recommendation, an offer or a search result. The hotel database may be used, for example, to obtain relevant hotels locations close to particular points of interest present in a captured image. For example, a selection of hotels within very limited range of the Eiffel Tower may be obtained from hotel database 118 in response to a captured image of the Eiffel Tower, which may be considered more relevant than a general list of hotels in Paris as a whole. Likewise, events database 120 may be used to obtain specific events that are identified within a captured image or associated with elements identified within such an image. Thus, for example, if a captured image is found to include a poster of Paris with text describing a "Paris Art Exhibition November. 2013," then a ticket to the Paris Art Exhibition may be proposed to the user, e.g., as part of a package, search result, recommendation or offer.

An inferred visual elements database 122 may be used to store captured images, extracted visual elements, analysis results, textual elements, and other data generated during a visual booking operation for use in subsequent analysis. As such, background processes may be used to further analyze such data, e.g., to develop user profile information for targeted marketing, as feedback to improve visual booking operations, to perform more complex and time consuming off-line analysis, etc.

In addition, reservation system 108 may also include a visual elements extraction module 124 and a visual elements inference module 126. Visual element extraction module 124 may be used to extract from a visual scene (e.g., captured via an image capture device on a wearable or mobile device, or otherwise received from such a device) a set of visual elements, where each visual element is a part of the visual scene represented by the captured image. Each visual element in the visual scene, for example, may be considered to be a convex quadrilateral depicting an object, element or portion thereof within the three dimensional space viewed and captured by an image capture device. Visual element inference module 126, in turn, is used to analyze the extracted visual elements to draw inferences as to their meaning and relevance to the travel domain more generally, and more specifically to a visual booking operation consistent with the invention.

It will be appreciated that additional modules may be resident in any of devices 12, 14, 20, 22 and system 16 to perform additional functions associated with a visual booking operation, and that the functionality may be allocated differently among modules and/or among devices/systems. In some embodiments, modules may be combined or split, and some functionality may be omitted. Therefore, the invention is not limited to the particular architecture illustrated in FIG. 2.

Figure 3:
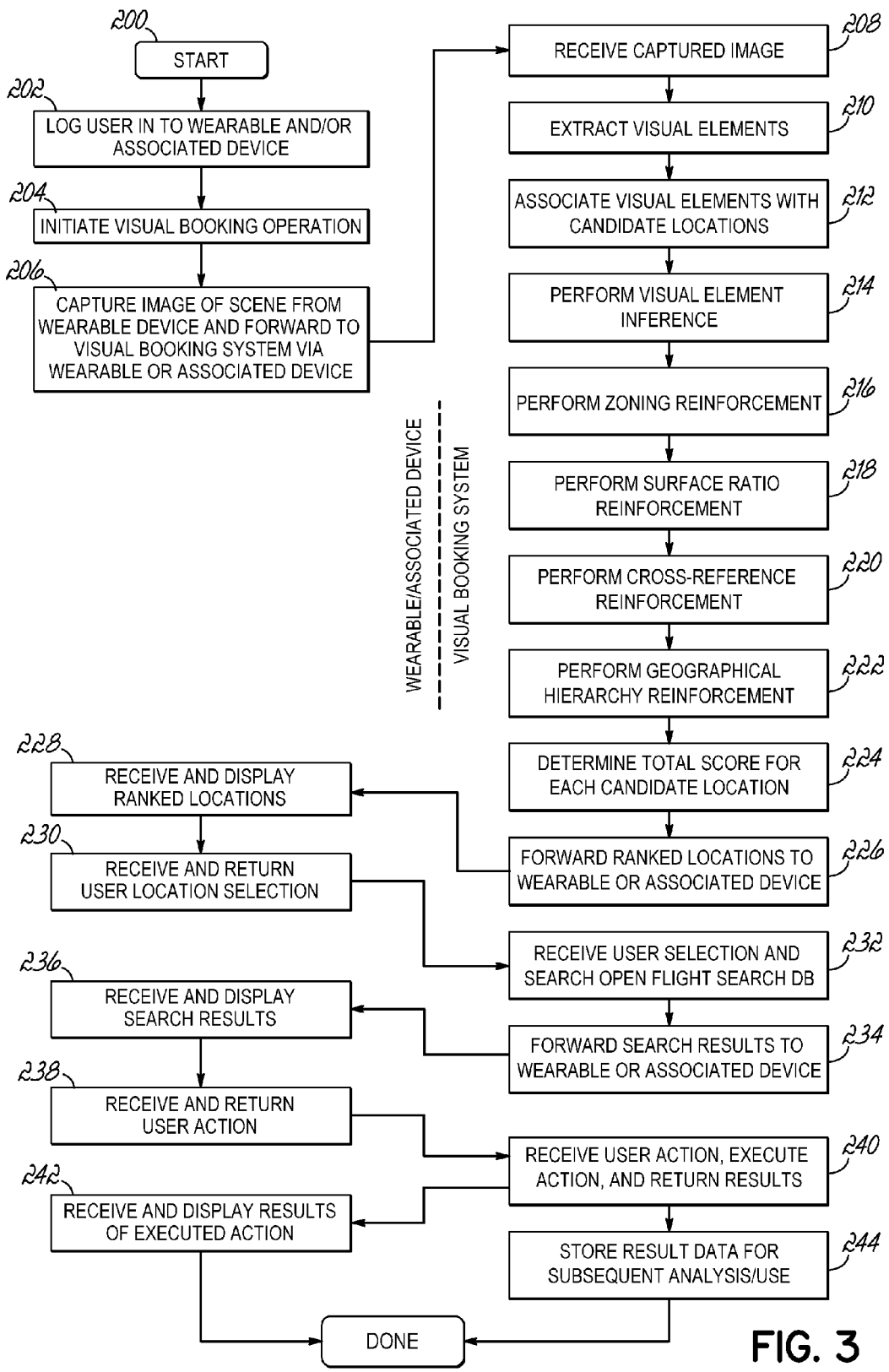
FIG. 3 is a flowchart illustrating an example sequence of operations for performing a visual booking operation in the system of FIGS. 1-2.

Using the aforementioned architecture, an on-demand visual booking operation, also referred to as an on-demand suggestion or recommendation, may be implemented in the manner illustrated by routine 200 in FIG. 3. An on-demand visual booking operation, within the context of the invention, may be considered to be a visual booking operation that is initiated in response to a user request, typically in response to a user capturing an image with a wearable or associated mobile device. In addition, generally an on-demand visual booking operation results in the generation of one or more of search results, travel offers, travel products, travel packages or travel recommendations, which may also be combined with additional user actions such as completing bookings, refining or filtering search results, bookmarking, sharing with another user or social media outlet, forwarding to another device, getting directions to a traditional travel agency offering similar travel offers, travel products or travel packages, automatically comparing the price of travel offers, travel products or travel packages between several travel distributors (e.g. online travel agencies), putting an option on a travel product (e.g., pre-booking) for a future booking completion and payment, etc.

For routine 200, actions performed by a wearable and/or mobile device are illustrated in the left column, while actions performed by a visual booking system are illustrated in the right column. Thus, routine 200 begins in a wearable or mobile device by logging the user in to the device (block 202) and then initiating a visual booking operation, e.g., by depressing a hard or soft button, issuing a voice command, etc. (block 204). For example, for smart glasses, a voice command such as "OK, travel there next month" may be sufficient to initiate a visual booking operation.

Upon initiation of a visual booking operation, control passes to block 206 to capture an image of the visual scene with the image capture device of the wearable or mobile device and forward the captured image to the visual booking system. Then, in block 208, the captured image is received, optionally along with additional information such as a user identifier and a user's current location (e.g., geolocation data captured from a GPS sensor), as well as potentially any information embedded in the image (e.g., EXIF data), etc.

Next, in block 210, visual elements are extracted from the captured image, e.g., by visual elements extraction module 124, along with OCR module 102, image analysis module 104 and natural language processing module 106, to generate sets of text elements and image elements (the latter of which may also be referred to as sub-scenes) extracted from the captured image and associated with the captured visual scene. Next, in blocks 212-222, visual elements inference module 126 processes the visual elements to determine one or more candidate destination locations to which a user may wish to travel. Block 212 attempts to associate visual elements with candidate locations, block 214 performs visual element inference to attempt to logically link visual elements to one another, block 216 performs zoning reinforcement to weight visual elements based upon their proximity to a user's likely focus, and block 218 performs surface ratio reinforcement to weight visual elements based upon their relationship to a global surface of the visual scene. Block 220 performs cross-reference reinforcement to identify cross-references between visual elements, and block 222 performs geographical hierarchy reinforcement to correlate visual elements according to a geographical hierarchy.

Next, block 224 determines a total score for each candidate location based upon the aforementioned inference analysis, and block 226 forwards a ranked list of candidate locations to the wearable or associated mobile device for consideration by the user. The ranked locations are then received and displayed by the wearable or mobile device in block 228. In some embodiments, for example, only the top location may be presented to the user, and in some embodiments, a search may be automatically initiated for the top ranked location. Lower ranked locations may be considered as alternate locations that may be used to override the top ranked location. In other embodiments, the user may be presented with a ranked list of multiple locations for selection by the user.

Next, the user location selection may be received from the user and returned to the visual booking system (block 230). For example, a user may touch a button or touch sensitive surface to confirm a location selection, or may issue a voice command, speaking the location or a line number of the location in the list. In block 232, the visual booking system receives the user selection and initiates a search on the open flight search database 114 to identify at least one travel product for travel from a travel origination location to the travel destination location, e.g., a ticket for air travel on one or more airlines. It will be appreciated that in other embodiments, travel products for travel between a travel original location to a travel destination location may include air travel, train travel, bus travel, travel by ship, or travel by practically any other form of travel between two geographical locations for which a ticket or fare may be purchased.

Next, in block 234, the search results obtained from the open flight search database are forwarded to the wearable or associated mobile device, and the search results are received and displayed or otherwise presented to the user in block 236. Once displayed or otherwise presented to the user by various audio and/or visual representations, the user may initiate a user action in block 238, e.g., to complete a booking, to view more results, to request related travel products such as hotels, rental cars, or events, to transfer the booking process from the wearable device to the associated device for convenience, to create a bookmark to enable the user to book later, to temporarily reserve or book an option for a travel product, to obtain directions to the closest travel agency offering similar travel products/offers, etc. For this reason, blocks 208-236 may be considered to constitute a "pre-shopping" phase, while blocks 238 and up may be considered to constitute a "shopping" phase of a visual booking operation.

In block 240, the visual booking system receives the user action, executes that action, and then returns the results to the user. The returned results are then received and displayed to the user in block 242. It will be appreciated that an interactive, multi-step process may also occur, resulting in multiple iterations of blocks 232-242 as a user interacts with the visual booking system. At some point, however, the visual booking operation is complete, and routine 200 terminates. In addition, as illustrated in block 244, generally the result data generated from the analysis of the captured image may be stored in inferred visual element database 122 for subsequent analysis and/or use by the visual booking system.

Now turning to FIGS. 4-9, these figures illustrate in greater detail a number of the activities discussed above in connection with FIG. 3, within the context of an example on-request visual booking operation, e.g., a visual booking operation triggered when a user wearing a wearable device and using an associated mobile device specifically initiates a visual booking operation.

Figure 4:
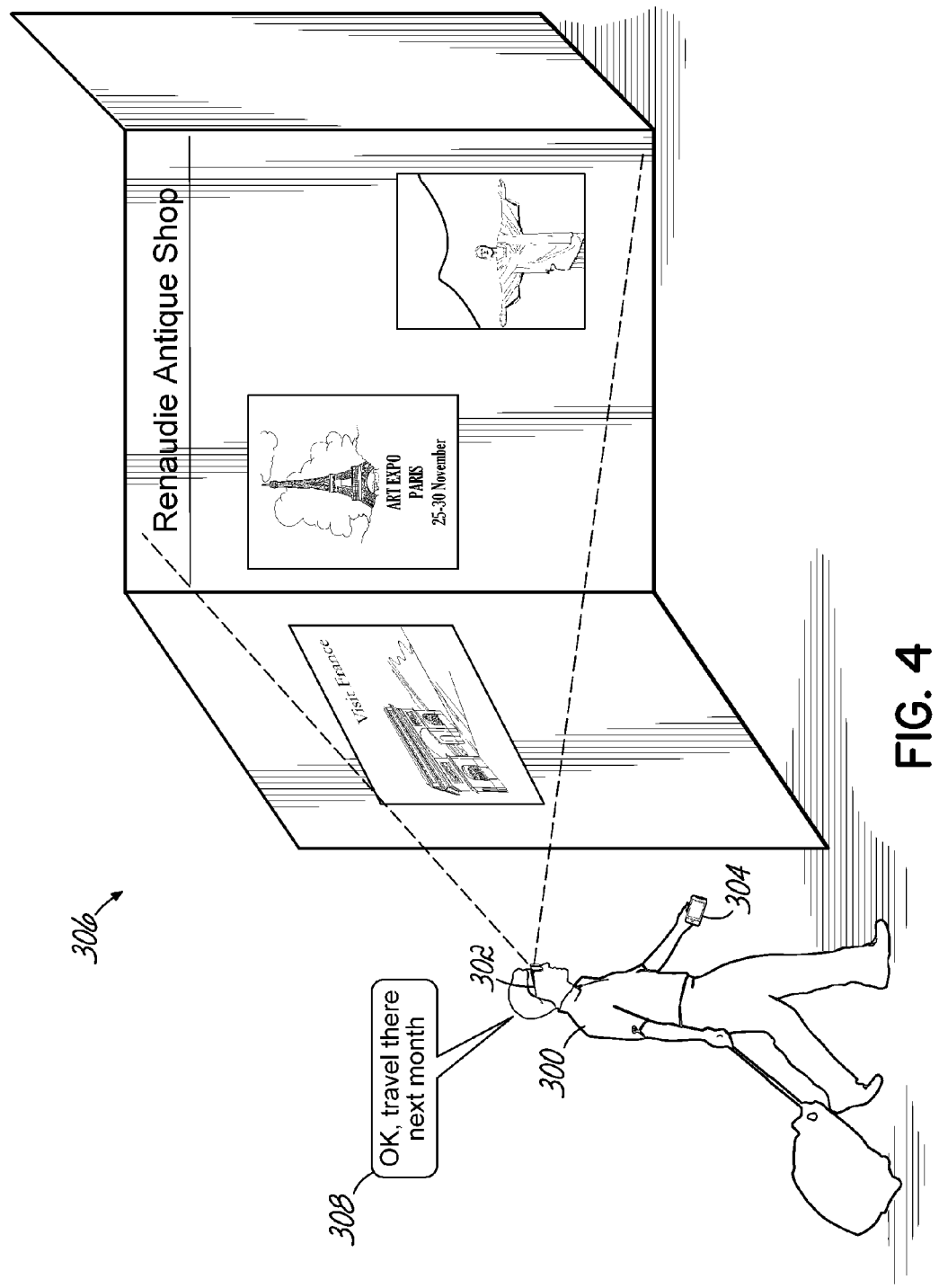
FIGS. 4-9 are graphical views illustrating the operation of various steps in the flowchart of FIG. 3 when analyzing example scenes captured by a wearable device.

First, as illustrated in FIG. 4, a user 300 having a wearable device 302, e.g., smart glasses, and an associated mobile device 304, e.g., a smartphone, may be located at a current location 306, e.g. walking down a city street, and may notice in his or her immediate surroundings some ads, printouts or any pictures and/or text, depicting one or more famous places in the world. For the purposes of this example, it may be assumed that user 300 is registered (or logged in to wearable device 302) beforehand, so the user may initiate a pre-shopping flow of a visual booking operation by activating wearable device 302 either by voice control (e.g. Say "OK, travel there next month" to the wearable device) or by a physical touch of some button/sensor on the surface of the wearable device 302. At this moment, the wearable device may capture a "visual scene" representative of the user's current focus, causing a digital image to be captured and forwarded to a visual booking system to analyze the digital image by extracting and processing visual elements from the visual scene. It will also be appreciated that at least some of the analysis may be performed locally in the wearable and/or associated mobile device in other embodiments.

Figure 5:
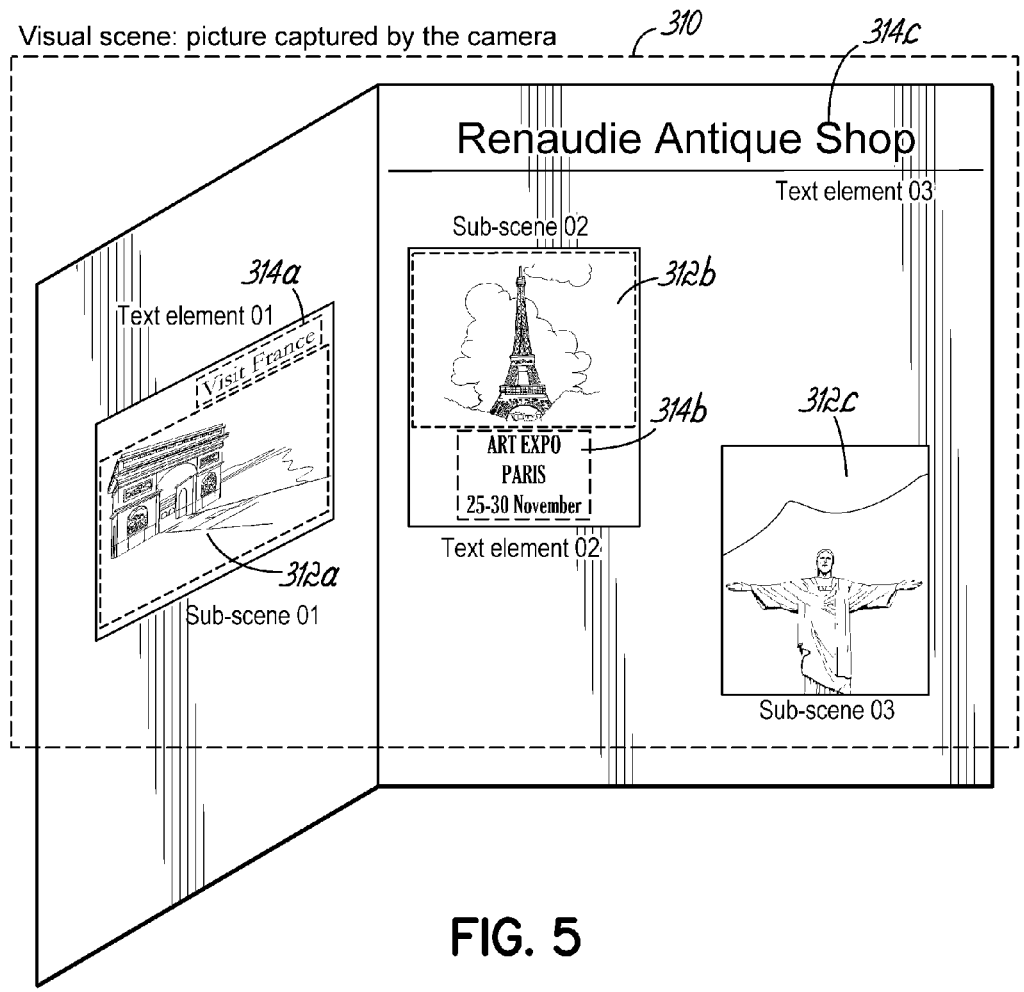
Figure 6:
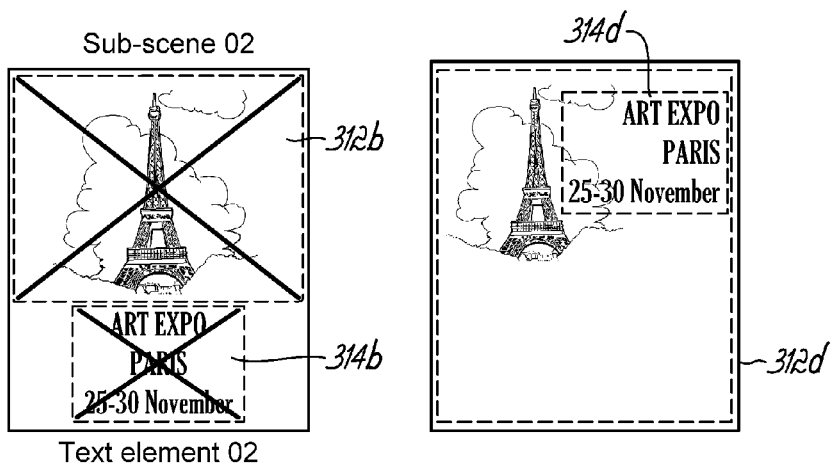

When performing the analysis, visual elements, which may include image elements and/or text elements, are extracted (block 210 of FIG. 2). FIG. 5, for example, illustrates a captured digital image 310 along with three example image elements 312a-c (also referred to as sub-scenes) and three example text elements 314a-c. OCR recognition may be used to generate a list of all visual elements of a "textual" nature present in the visual scene, which are then identified and tagged as text elements. Likewise, image analysis of the visual scene may be used to identify visual elements of "image" nature (e.g. a picture of the Eiffel Tower on a shop's vitrine, a map of Australia on a wall, a landscape on a mechanical billboard, a travel agency logo, etc.), representing sub-scenes of the visual scene, which are then identified and tagged as image elements. It will be appreciated that standard OCR and image analysis techniques may be used to extract these elements from the visual scene.

Next, the text and image elements may be analyzed by visual elements inference module 126 (FIG. 1), which extracts "inferred data," e.g., using standard image and text inference methods. Since the visual booking system is generally focused on finding travel related information (e.g., places in the world, travel period, travel agency name, name of an airline or hotel chain, etc.), a supervised, domain-specific supervised classification methodology may be implemented, as opposed to the comparatively more complex domain-agnostic unsupervised classification methodology that would otherwise be required for a generic scene analysis.

For example, visual elements, hereinafter referred to as location visual elements, may be associated with particular candidate locations, e.g., taken from a predefined list of places based on IATA points of interests stored in referential database 110 (FIG. 1, see also block 212 of FIG. 2). A filter may be applied to identify only those locations that exist as a possible input for a travel request. Based upon visual elements 312a-c and 314a-c of FIG. 5, for example, candidate locations may include Rio de Janeiro and Paris, although candidate locations may be defined at other levels of geographical hierarchy, such as a country (e.g., Brazil) or a continent (e.g., Europe). Those visual elements being geographical names (e.g., cities, airports, countries, etc.) may be flagged with a location data type in a table of visual elements, and a data sub-type (city, country, or continent, etc.) may also optionally be extracted, along with an explicit value. Thus, in some embodiments, visual elements may be considered to be location elements, and may be associated with either an image/sub-scene or text.

In general, non-location visual elements (i.e., visual elements not associated with specific candidate locations), are not tagged with a location data type, but are retained for further uses and assigned a different data type specific to their respective content. For example, the non-location data types that may be used in some embodiments include but are not limited to:

Dates/time periods (e.g., "25-30NOV."): elements associated with particular dates or time periods, which may be identified, for example, by matching against a set of pre-defined regular expressions, e.g. "DD M*", "DDMMMYY," or keywords such as "Winter."

Durations (e.g. "one week"): elements associated with lengths of time.

Activities/Events (e.g. "Art Exhibition"): elements associated with particular activities/events, which may be identified, for example, by matching against a predefined list of expected keywords (in several languages), e.g., "exhibition", "concert", "conference", "expo", etc. In some embodiments, activities may be generic to events, such that additional activities, e.g., golf, scuba diving, amusement parks, guided tours, gastronomic tours, etc. may be defined as additional sub-types of the event data type.

Prices (e.g. "$1500 per person"): elements associated with particular currency values, optionally including the form of currency.

Types of Travel Products (e.g. "flight and hotel"): elements associated with different types of travel products, e.g., for travel by air, train, ship, bus, etc., as well as other travel products such as hotels, car rentals, etc.

Travel Provider or Travel Distributor (e.g. "Air France" or "Expedia"): elements associated with particular providers or distributers of travel products, which may be identified, for example, by matching against a list of known travel providers (e.g., airlines, hotels) or travel distributors (e.g., online or traditional travel agencies, tour operators, etc.).

Others (e.g. "Renaudie Antique Shop"): elements not matching against any pre-defined data type. A default data type such as "none" may be used in such instances, and in some embodiments, the elements marked as such may be ignored in the rest of the process.

In some instances, a particular text element may be associated with multiple location and non-location data types, and as such, in some embodiments it may be desirable to generate multiple text elements or to assign multiple data types to a particular text element. As an example, text element 314b of FIG. 5 is identified as including the text "Art Expo Paris 25-30 November," and from this text, e.g., as derived using natural language processing by module 106 (FIG. 1), a location (city of "Paris"), an event type ("Art Exhibition") and a date range ("25-30NOV.") may be identified and tagged. Other examples include "One week in Mexico from $1300 per person", or "Fly to Dubai in March with Emirates," each of which may be processed to identify multiple data types.

In addition, it will be appreciated that image elements may also be associated with multiple data types. For example, an image element may be associated both with a location and a travel provider/distributor's logo.

Furthermore, in some embodiments, it may be desirable to utilize additional information when classifying visual elements. For example, if geolocation data is available indicating the user's current location, visual elements associated with that location may be discarded from consideration in a visual booking operation. Thus, for example, For example, if a picture of the Eiffel Tower in a user's visual scene, but the user is detected as currently being in Paris, visual elements related to this current location may be discarded as not being relevant to determining appropriate locations for generating travel suggestions or products.

Table I below, for example, illustrates an example data structure (referred to herein as a visual elements table), which may be used to store comparable classification data associated with the visual elements of FIG. 5:

TABLE I

Visual Element Classification

| Visual Element | Inferred Data | Data Type | Data Sub-type | Value |
|---|---|---|---|---|
| Sub-scene 01 (312a) | Photo of Arc of Triumph in Paris, France | Location | City | Paris |
| Sub-scene 02 (312b) | Photo of the Eiffel Tower in Paris, France | Location | City | Paris |
| Sub-scene 03 (312c) | Photo of Corcovado, Rio de Janeiro, Brazil | Location | City | Rio de Janeiro |
| Text element 01 (314a) | "Visit France" | Location | Country | France |
| Text element 02 (314b) | "Art Expo Paris 25-30 November" | Activity | Event | Exhibition |
| Text element 02 (314b) | "Art Expo Paris 25-30 November" | Location | City | Paris |
| Text element 02 (314b) | "Art Expo Paris 25-30 November" | Date | Date Range | 25NOV13 to 30NOV13 |

TABLE I-continued

Visual Element Classification

| Visual Element | Inferred Data | Data Type | Data Sub-type | Value |
|---|---|---|---|---|
| Text element 03 (314c) | "Renaudie Antique Shop" | None | None | None |

It may also be desirable in some embodiments to logically link location and non-location elements together. As shown in the example above, several non-location visual elements are logically linked together and could even be linked to a location visual element. Logical linking may be used, for example, for discarding irrelevant suggestions of date range for a given location (e.g., dates in the past). Since it may be desirable for a visual booking service to recommend relevant trips to users, it may be desirable to focus which implies the recommendation of the relevant destination but also, when available, the relevant travel period (date range) or simply the trip duration (e.g., "One week"). For example, as illustrated in the left half of FIG. 6, image element 312b of image 310 (FIG. 5), which represents the Eiffel Tower (so the location "Paris"), may be logically linked to the text elements "ART EXPO" (an event) and the date range "25-30 November" and to the location "Paris" (explicitly mentioned in the text).

Rules may be established to logically link elements. For example, one rule may specify that if several elements have been deducted from the same text element (e.g., via OCR and Natural Language Processing), then the elements are automatically logically linked together. Another rule may specify that if a non-location element is close to one or more elements representing a location, then the two elements may be considered as logically linked. Two elements may be considered to be close based upon various geometric relationships. For example, two elements may be considered close when the convex quadrilaterals from which elements have been extracted are overlapping, or where one shape is contained within the other one, e.g., as illustrated by elements 312d, 314d in the right half of FIG. 6. As another example, two elements may be considered close when a shortest distance between the convex quadrilaterals from which elements have been extracted is small compared to the distance with other elements.

Next, zoning reinforcement (block 216 of FIG. 3) may be performed to weight visual elements relative to the user's point of view in the scene, i.e., the location that the user is likely focusing his or her view when the image is captured. Weighting visual elements in this manner desirably assigns a greater importance to what the user is "centrally" looking at, while decreasing the relative importance of peripheral elements.

Figure 7:
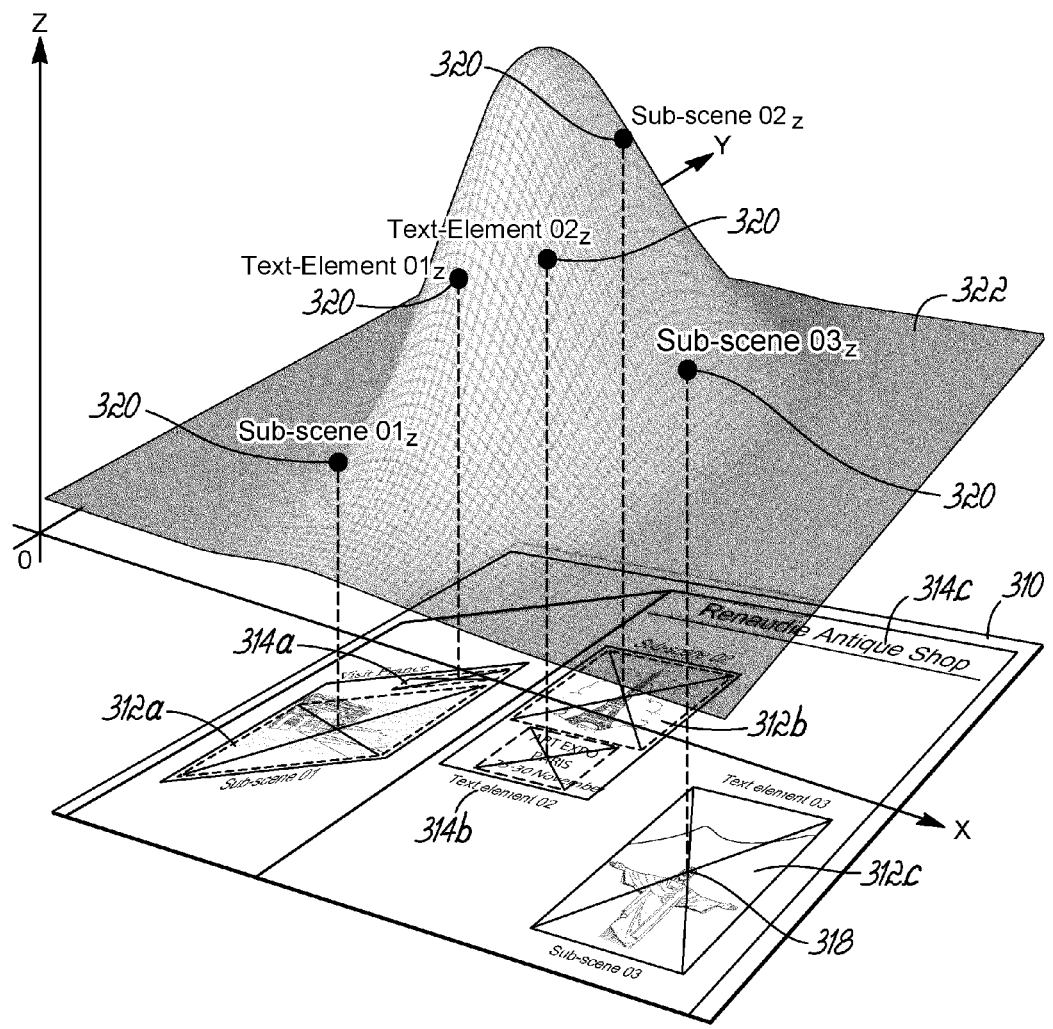
Figure 8:
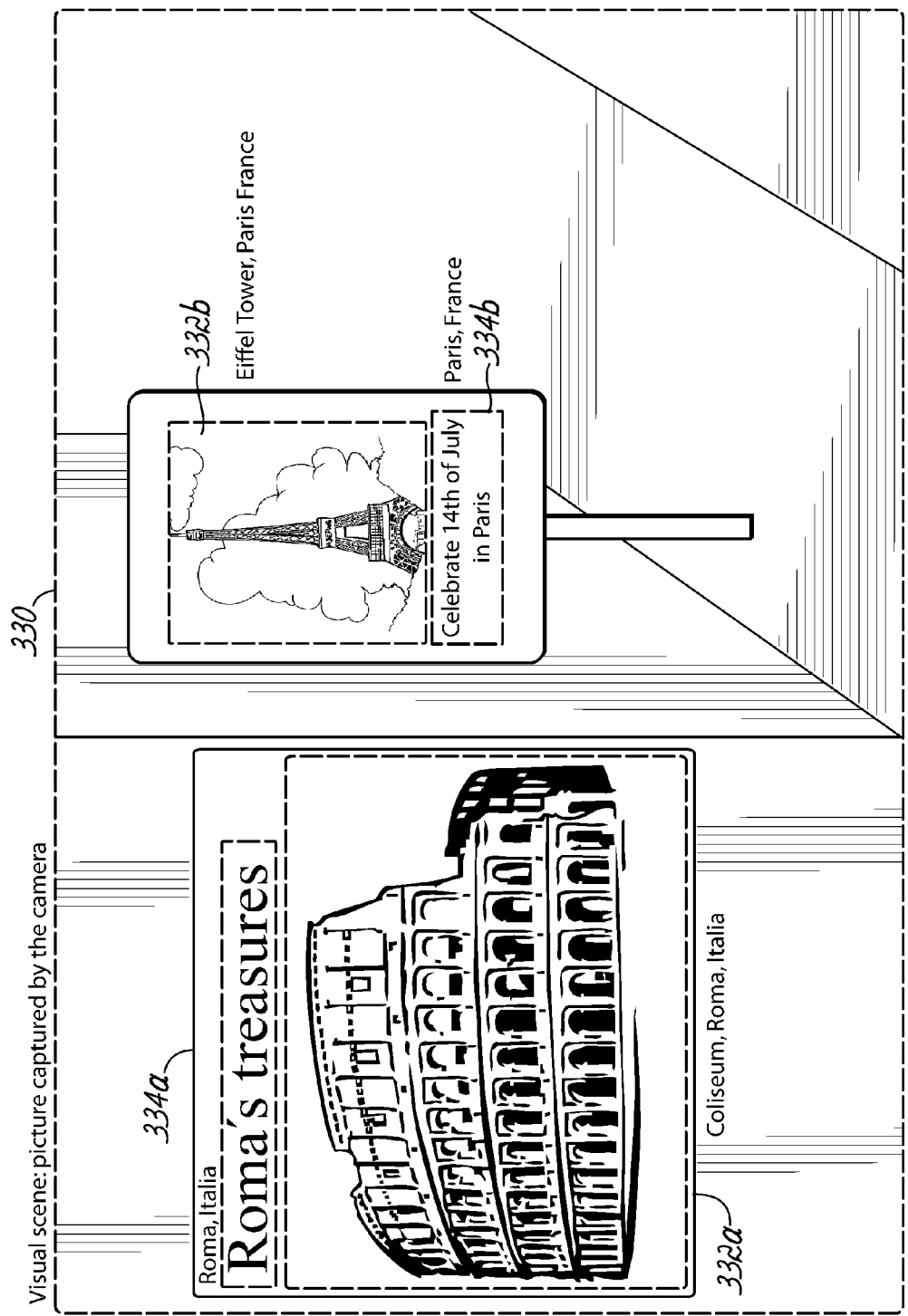

In one embodiment, for example, each identified visual element may be situated on a two dimensional map of the visual scene by determining a bounding parallelogram for the element and a vertex centroid therefor. For example, as shown in FIG. 7, visual element 312c is depicted with a bounding parallelogram 316 and vertex centroid 318, with similar bounding parallelograms and vertex centroids additionally displayed for visual elements 312a-312b and 314a-314b. The captured image 310 representing the visual scene is oriented on the x/y plane of a three dimensional volume, and a zone weight value 320, represented along the z-axis of the volume, is calculated for each vertex centroid, e.g., using a normalized Gaussian distribution 322 (max z=1.0) centered on the vertex centroid of the overall image 310 (representing the focus point for the user). The Gaussian distribution assigns greater weight to visual elements located proximate the vertex centroid of the overall image, and quickly decreases for elements positioned away from the vertex centroid.

Accordingly, in one embodiment, each visual element $e_i$ may be associated with a zone weight value $w_{1,i}$, and stored in the visual elements table. It will be appreciated that other distributions may be used in other embodiments. In addition, it will be appreciated that the point of view of the user may be determined in other manners from the geometric center of the image. For example, eye tracking technology or other known manners of determining a user's focus may be used to determine where in a visual scene the user has focused when an image is captured, such that zoning reinforcement may be centered at a point offset from the geometric center of a captured image.

Next, surface ratio reinforcement (block 218 of FIG. 3) may be used to identify, for each visual element, which elements are more prominent in the user's field of view, and to appropriately weight elements based upon this relationship. For example, a global surface of a visual scene may be determined from a captured image, e.g., to determine a surface area for the overall captured image, and the surface area for each visual element may be computed (e.g., based on the bounding parallelogram thereof) and compared against the overall surface area, e.g., to weight based on the ratio between the visual element's area and that of the global surface. Thus, for example, for the visual scene represented in captured image 330 of FIG. 8, in general image element 332a and text element 334a may be weighted greater than image element 332b and text element 334b due to their comparatively larger presence in the user's field of view.

Accordingly, in one embodiment, the surface are of each visual element $e_i$ may be computed from the captured image, then a ratio $w_{2,i}$ may be computed against the captured image's overall surface area, and stored in the visual elements table. In addition, in some embodiments, weighting may also be performed based upon the orientation of the visual elements in the three dimensional space relative to the primarily plane of the visual scene. Thus, for example, as illustrated in FIG. 5, visual elements 312b-c and 314b-c, which are oriented along a surface that is generally parallel to the primary plane of the visual scene (e.g., the plane substantially normal to the point of view), may be weighted more than visual elements 312a and 314b, which are oriented along a plane that is angled relative to the primary plane.

Next, cross-reference reinforcement (block 220 of FIG. 3) may be used to reinforce elements of the visual scene that correspond to a location (e.g. a city, a region, country, continent etc.), having several occurrences, possibly under different element types. For example, if the candidate location "Paris" appears in the visual scene as both a text element and also as a picture of the Eiffel Tower, this candidate location may be weighted higher in the visual scene as having a strong presence where the user is currently looking. Accordingly, in one embodiment, for each location visual element $e_i$, a ratio may be computed between the number of its occurrences (across both text and image elements) and the total number of location elements in the scene. This cross-reference weight $w_{3,i}$, may then be stored in the visual elements table.

Thus, for example, in the example scene of FIG. 5, where there are a total of five location elements, since the candidate location "Paris" appears as a city three times (image elements 312a and 312b and text element 314b), resulting in a cross-reference weight for each visual element of ⅗ or 0.60. Both candidate location "France" and candidate location "Rio de Janeiro" appear only in one location element (text element 314a and image element 312c, respectively), resulting in a cross-reference weight for each of these elements of ⅕ or 0.20.

Figure 9:
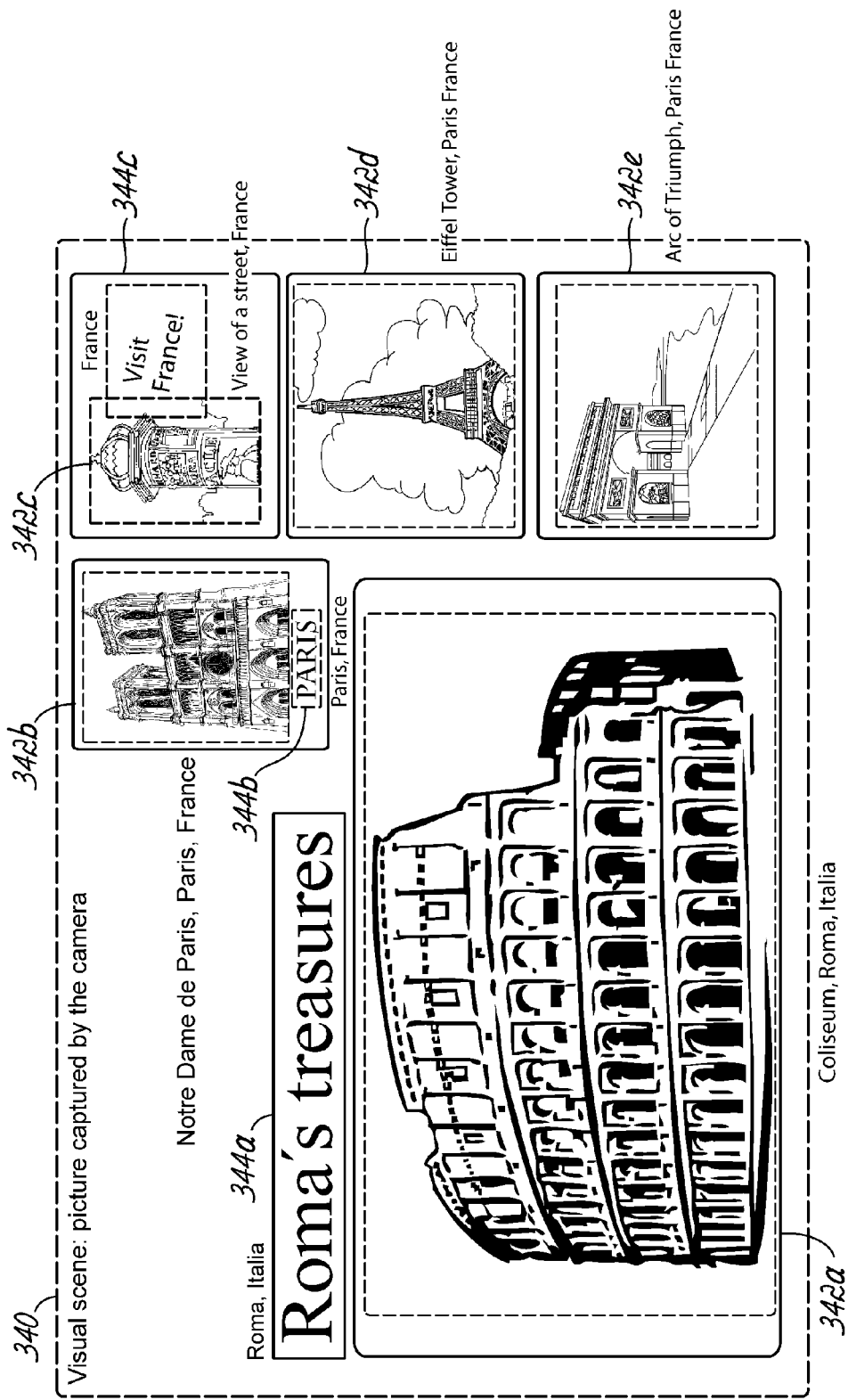

As another example, FIG. 9 illustrates another visual scene represented by a captured image 340, including five image elements 342a-342e and three text elements 344a-344c. When performing cross-reference analysis, the candidate location "Paris" is found to appear four times, while each of the candidate locations "France" and "Roma" is found to appear two times. As such, even if in the visual scene the sizes of the visual elements associated with candidate location "Roma" results in greater weighting from surface ratio reinforcement, the cross-reference reinforcement for candidate location "Paris" may counteract this weighting sufficiently to rank "Paris" as a more likely candidate location.

Next, geographical hierarchy reinforcement (block 222 of FIG. 3) may be performed to correlate visual elements having meaningful geo-localization, and reinforce locations pertaining to the same sub-division of a geographical area. For example, a hierarchy may be defined, such as Continent>Sub-continent>Country>State>Region>County>City. As a result, in one embodiment, for each location element $e_i$ in the visual elements table, a geo weight may be computed as follows: if another element of higher position in the geographical hierarchy is present at least once in the visual scene, increase its geo weight by 1.0. Non-location elements, on the other hand, may not be updated. Thus, after a full scan over the visual element table applying the above mechanism, the system may compute a geo weight $w_{4,i}$ for each element.

Thus, for example, considering the example illustrated in FIG. 5, and for the sake of this discussion, assuming a visual element associated with the candidate location "Europe" is also present in the visual scene, since "France" is a sub-geographical area of "Europe", a geo weight of 2.0 may be assigned to any "France" location element, and since "Paris" is a sub-geographical area of "France", a geo weight of 3.0 may be assigned to any "Paris" location element. Conversely, while "Rio de Janeiro" is a sub-geographical area of "Brazil", but there is no occurrence in the visual scene of any visual element associated with the location "Brazil", a geo weight of 1.0 may be assigned to any "Rio de Janeiro" location element.

Subsequent to the aforementioned analysis, a total score may then be computed for each candidate location based upon the visual elements in the visual scene (block 224 of FIG. 3). For example, in one embodiment, all weights previously generated may be taken into account to compute a total score of each visual element in the visual scene. Each analysis operation's weight importance may also be increased or decreased using an operation factor $\alpha_j$ for the operation j, thereby permitting the relative importance of each analysis operation to be fine tuned. For example, it may be desirable in some embodiments to impart a higher importance to the zoning reinforcement operation than the cross-reference reinforcement, which may be achieved by associating a higher operation factor to the first and a lower operation factor to the second. By default, each factor may be assigned a relative importance $\alpha_j$ in the system. Thus, for each visual element $e_i$, a total score $S_i$ may be determined as follows:

$$S_i = \sum_j \alpha_j w_{j,i}$$

where index j=1 to the total number of weighted analysis operations (4 in the example disclosed herein). It will be appreciated that in other embodiments, fewer, alternate or additional analysis operations may be performed to modify the relative importance of each visual element in the visual scene. For example, other geographical location and/or travel-related principals may be applied to tailor the weighting of visual elements in other embodiments.

As such, in the illustrated embodiment, visual elements may be weighted at least in terms of visual size, their respective places with regard to the user's focus in the visual scene, and their relative numbers of occurrences, geographical hierarchy and generally without distinguishing between image and text content.

As another example, returning to FIG. 8, analysis of the visual scene represented by captured image 330 may identify visual elements 332a, 332b, 334a and 334b as location elements, and as a result of cross-reference reinforcement, "Paris" will be found to appear two times and "Roma" will be found to appear two times. In addition, as a result of zoning reinforcement analysis, visual elements 332b and 334b, associated with location "Paris", will be found to be closer to the center of the visual scene, and thus closer to the center of the field of view of the user. On the other hand, as a result of surface ratio reinforcement, the surface ratios between the "Roma" related visual elements 332a and 334a will be greater than the surface ratios corresponding to the "Paris" related visual elements 332b and 334b. Depending upon which analysis is weighted higher using the operation factors, therefore, "Roma" or "Paris" could be ranked higher as a candidate location.

Once total scores are computed for the visual elements, candidate locations may themselves be scored and ranked based upon the scores of the visual elements. For example, in one embodiment, location grouping may be performed to group all location elements having the same location value into a single location element, with the score of that location element being the sum of scores of grouped elements. For example, if the location "Paris" appears in different location elements, the scores computed above for each element may be summed to generate a total score for the "Paris" candidate location. Next, location ranking may be performed by sorting all location elements based on their respective grouped scores, resulting in a ranked list of candidate locations with decreasing scores.

In some embodiments, the top ranked location may be used as a travel destination location in a call to an open flight search module or any other suitable travel pricing module. In other embodiments, lower ranked locations may also be presented to a user as alternative locations, such that the user may select from a list of candidate locations. In some embodiments, the lower ranked locations may only be presented if the user declines the top ranked location. If a travel destination city or airport cannot be identified from the location selected by a user (e.g., because the determined location is a state, a country, a sub-continent or a continent), then a set of travel destination cities or airports corresponding to the selected location may be used for the search.

When making a call to the open flight search module, the travel destination location may be provided along with additional information suitable for identifying travel products for travel to the travel destination location. For example, a travel origination location may be provided. The travel origination location in some embodiments may be based on the current location of the user, e.g., as determined using geolocation data such as GPS data collected from a wearable or mobile device. The location may correspond to the closest city or airport matching the open flight search module's database and the associated list of supported origin cities or airports, and the search may also search for other cities or airports within a particular distance from the current location. In addition, where no GPS signal is available at the time the operation is initiated, a last known position can still be used, or a user's default location (discussed below) may be used.

In other embodiments, a user may be associated with a default location, e.g., as specified in a user profile. The default location, for example, may be associated with the user's home address. In some embodiments, the user may set a preference favoring the user's current location or default location as the initial travel origination location input.

Additional information that may be provided in a call to the open flight search module include various types of information generally used in searching for travel products. For example, a travel date or dates may be provided. For example, if a date element is identified during visual element extraction and/or inference, and is determined to be logically linked to the travel destination location, one or more dates may be used for departure and/or return dates. Thus, for the example of FIG. 5 and Table I above, where a text element is classified as a date element with a date range of 25 NOV. 13 to 30 NOV. 13, departure and/or return dates a day before and a day after may be provided.

As another alternative, dates may be provided as input by the user, e.g., via a voice command, either in response to a prompt from the wearable or mobile device, or during the initial triggering of the visual booking operation (as illustrated at 308 in FIG. 4), or via text or graphical input. As yet another alternative, dates may be deduced from a "duration" element determined during visual element extraction and/or inference. As one example, if a text element is found stating "One week in Mexico in Spring", then one or more departure dates in spring may be selected, along with a return date one week later. In other embodiments, no dates may be supplied, and the open flight search module may search on an un-predefined set of dates within a predefined period (e.g., within 6 months or one year).

Another type of information that may be provided is a preferred travel provider or travel agency, which are collectively referred to herein as travel-related entities (which may also include addition entities that are affiliated with the travel industry). For example, if a travel provider or travel agency is identified during extraction and/or inference, that information may be used as a criterion for the request. For example, where an airline or hotel name/logo is identified, only travel products for that travel provider may be returned as a result of the search. Likewise, where a travel agency logo or name is identified, only travel products offered by that travel agency may be returned, and in some instances, a search may be focused on a particular database of travel products associated with that travel agency.

Further information may include various user preferences, e.g., preferred travel providers (airlines or other common carriers), preferred types of travel (air travel, train travel, bus travel, etc.), preferred times, or practically any other information that might otherwise be used to search for travel products using non-visual booking operations.

Once a call is made to the open flight search module, results may be stored in a local memory of the wearable or mobile device, and then displayed or otherwise presented to the user using audio and/or visual information, either on the wearable device or the mobile device. In some instances, a first recommendation in the search results may be displayed, e.g., a set of connected flights for outbound and inbound travel and an associated price for the trip may be displayed as an overlay in the visual scene of a user wearing a pair of smart glasses.

As such, the user is immediately informed that he/she can go the place he/she was just looking at a few seconds before, for this given, at the best price (or for the price corresponding to the most popular flight addressing the need). In addition, in some embodiments, the user can then loop between other recommendations using, for example, a physical tactile zone of the device, and possibly choose one by clicking on it or verbally requesting selection of a particular recommendation. If he/she does so, the user action of "BOOK NOW" may be returned to the visual booking system to initiate a shopping phase and thereby complete the booking.

If the user does nothing special within a few seconds, the overlay recommendation may be hidden; however, it may be desirable in some embodiments to retain the search result in a history of searches, should the user wish to access it at a later stage, and complete the booking at a later time (referred to as a "BOOK LATER" action). In this regard, it may be desirable to generate a unique identifier each time the user initiates a visual booking operation (i.e., the process described above from the visual scene extraction to the shopping phase), and associate that unique identifier with the user, with the captured scene, and with the analyzed visual elements. Thus, in some instances, a user may be able to effectively generate a "travel bookmark" from the visual booking operation to permit the booking to be completed at a later time, or to permit the results of that operation to be used for further searches.

Additional user actions may also be supported in some embodiments. For example, a user may choose to book an option on a recommendation immediately, through payment of a "Time to Think" small fee. In addition, a user may be directed to a closest "physical" travel agency, known to be in the immediate vicinity of the user based upon the user's known current location and travel agency database 116 (FIG. 2), which may include information about the travel agency, contact information, geolocation data and current available offers), and offering a special deal on the desired location.

In addition, travel offers or packages comprising multiple travel products may be generated and displayed to the user as travel recommendations. For example, a hotel stay may be incorporated into a recommendation sent to the user, e.g., by selecting a hotel based upon a geolocalized hotel database (e.g., database 118 of FIG. 2) and the location of a particular point of interest determined during visual element extraction and/or inference (e.g., near the Eiffel Tower in the example of FIG. 5). Doing so would provide a more customized and desirable travel offer than one in which hotels over the entirety of Paris were proposed. Additional non-location elements may be utilized in the generation of travel offers or packages. For example, tickets for events, e.g., as stored in events database 120 of FIG. 2, may be included in an offer based upon visual element extraction and/or inference (e.g., tickets for the art expo identified in the example of FIG. 5).

In some embodiments, to limit the results returned to the user, only the most popular travel products for the given origin, destination and travel dates may be returned. A travel product, e.g., a flight, may be considered as popular in some embodiments if, for the given origin, destination and travel period, it generates a maximum number of bookings in past years compared to other flights.

Once a user has initiated a user action to complete a booking (e.g., in block 238 of FIG. 3), a shopping phase of a visual booking operation may be initiated. Completion of a booking may be facilitated by storing user information in a user profile, e.g., user name, address, payment methods, frequent flier identifiers, etc. In addition, in some embodiments, it may be desirable to transfer a shopping flow from a wearable device to an associated mobile device. A mobile app or mobile web site, for example, may be used to complete a booking in a conventional manner.

When transferring to a mobile device, the following information may be passed to the mobile device: travel origination and travel destination locations to be used for the booking request, flight number (or other travel product identifier), travel dates, and a unique identifier attached to the visual scene extraction and inference data. Transferring the unique identifier may be useful, for example, to track which bookings have been completed via visual booking operations, and under which circumstances, e.g., to determine conversion rates.

In addition, in some embodiments, if a user has one or several frequent flyer credentials that have been previously stored in a profile, they can be used as an additional input to a visual booking operation and potentially return more interesting recommendations for a user.

Now returning to block 244 of FIG. 3, as noted above, result data may be stored for subsequent analysis and/or use, e.g., in a business intelligence database such as database 126 of FIG. 2. As also noted above, such information may be associated with a unique identifier that is associated with, for example, the user, the original visual scene, the extracted and/or inferred visual elements, including the point of interest information used to determine possible travel locations, the deducted locations, events, and/or dates, the associated ranking of locations, the date and time at which the visual scene was captured and/or the visual booking operation was initiated, the geolocation of the device that captured the visual scene (e.g., via the wearable device GPS or the associated mobile device GPS), and any feedback collected from the user as to any proposed travel destination location(s), e.g. "accurate/not accurate" or a rating (e.g., 1 to 5 stars), which may be useful in enhance future classification of the results and fine-tuning the visual booking system.

In addition, as the unique identifier is transferred to shopping (selection of the travel service), booking (actual reservation of the service) and ticketing engines, it may be possible to track which visual scenes are found to lead to which bookings and/or bookmarks. Such information may be used, for example, by travel providers to build targeted advertisement campaigns, based on user habits that may be detected though data mining of such a business intelligence database. It may also be possible through such data mining to identity useful information such as which pictures and/or points of interest increase a travel provider's conversion rate and the associated context (e.g., date and time, season, location, temperature, etc.), and which travel destination locations are selected in priority (e.g., when several visual scenes represent several different travel destination locations having different rankings). For example, a travel provider may determine that for the German market (i.e., people living in Germany) in winter, photos of Mexico representing a beach are more likely to trigger a booking than a photo of an Aztec pyramid. As a consequence, a travel provider or agency may adapt its communication materials for an upcoming season and improve marketing efforts by focusing on photos representing beaches.

It will be appreciated that the stored data may be used for determining other business intelligence, as well as for other marketing and/or informational purposes. In addition, other user actions may be supported in response to a visual booking operation. Therefore, the invention is not limited to the particular uses and actions disclosed herein.

Continuous Suggestion Engine

In other embodiments, it may be desirable to support visual booking operations that are not specifically triggered by a user, and are instead performed in a substantially continuous manner independent of user request. In such embodiments, a wearable device, mobile device and/or visual booking system may substantially continuously analyze a visual scene and search for travel recommendations to be presented to a user. It may be desirable in such embodiments to present travel recommendations in a discreet and non-obtrusive manner, e.g., as an augmented reality presentation on a wearable device.

Figure 10:
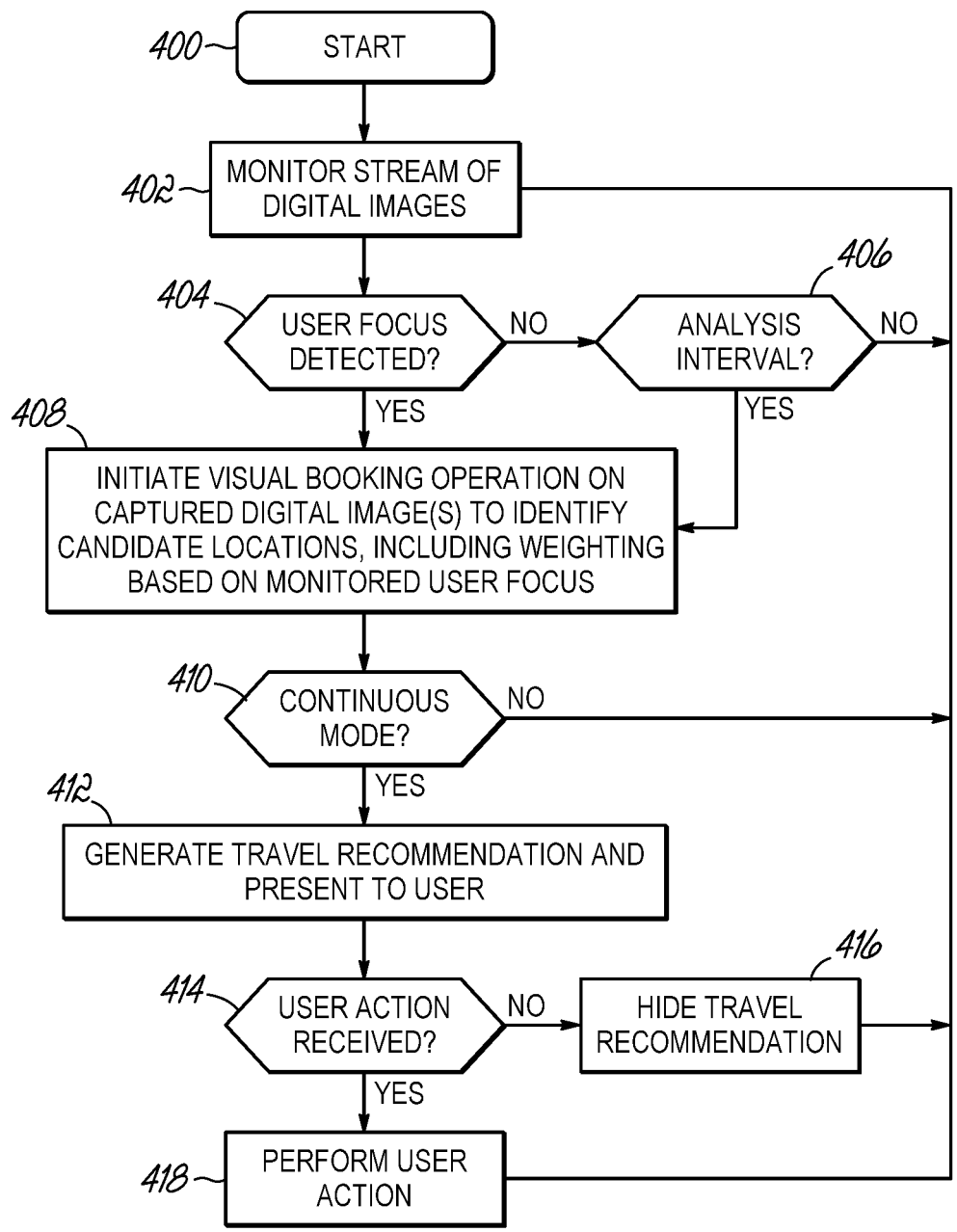
FIG. 10 is a flowchart illustrating an example sequence of operations for performing a continuous visual booking operation in the system of FIGS. 1-2.

FIG. 10, for example, illustrates an example routine 400 that may be executed by a wearable device, mobile device and/or visual booking system to present travel recommendations to a user. In this routine, a stream of digital images captured by an image capture device of a wearable or mobile device is continuously monitored (block 402). By "continuously", what is meant is that such activities are being performed on a frequent basis and in a background manner relative to the user experience, whether or not performed on at fixed or variable intervals, e.g., performed n times in a second, performed every m seconds, performed when the wearable device is not busy performing other operations, etc.

Monitoring, in this regard, may include tracking the time spent by a user when looking at various zones of a visual scene. This may be performed, for example, by taking the geometric center of each captured image and tracking the movement of this geometric center within a scene over time. Alternatively, eye tracking functionality may be used to track where in a captured image the user is currently focusing his or her view.

On a periodic basis, blocks 404 and 406 test two conditions that may be used to trigger further analysis, including the initiation of a visual booking operation. For example, block 404 determines whether the user has fixed his or her focus on a particular region of a visual scene, e.g., whether the user has been detected staring at a particular element in a scene. Thus, for example, if a user is walking down the street and glancing around while doing so, and the user sees a poster with text and/or an image related to a particular travel destination location and stops to read the poster, block 404 may determine that the user has indicated some interest in the content of that poster, and trigger further analysis. Block 406, on the other hand, triggers further analysis at periodic intervals, and regardless of whether the user has fixed his or her view. It will be appreciated that either of blocks 404 and 406 may be omitted in some embodiments.

If neither block 404 nor block 406 is triggered, control returns to block 402. Otherwise, control passes to block 408 to initiate at least a portion of a visual booking operation on one or more of the captured images from the stream to identify one or more candidate locations, e.g., using the operations discussed above in connection with blocks 210-226 of FIG. 3. In addition, it may be desirable in some embodiments to further weight elements based upon elements disposed in visual zones within a visual scene where it has been determined via monitoring that the user has focused his or her attention towards for some period of time. By doing so, elements that the user has spent time looking at can be emphasized in the determination and/or ranking of candidate locations.

Next, block 410 determines whether the user is currently in a continuous mode, rather than an on-demand mode. For example, in some embodiments, a user may be permitted to set a user preference that configures the visual booking system into a continuous or on-demand mode. In other embodiments, however, no user selection may be permitted, such that a visual booking system always operates in one mode or the other, whereby block 410 may be omitted.

If the user has selected an on-demand mode, the user is not presented with unsolicited travel recommendations, and as such, block 410 returns control to block 402. However, if the user has selected a continuous mode, control passes to block 412 to generate one or more travel recommendations and present those recommendations to the user, e.g., in a similar manner to blocks 232-236 of FIG. 3. It may be desirable in some embodiments, for example, to restrict the interaction with the user as compared to the on-demand mode. As such, when in a continuous mode, it may be desirable to not prompt the user to select a candidate location, but instead automatically select the top ranked candidate location. In addition, rather than present multiple travel recommendations to the user, it may be desirable to generate a single travel recommendation to be presented to the user. In one example embodiment, for example, if a user is wearing smart glasses, a highest ranked travel recommendation may be presented to the user for a few seconds on an augmented reality display, without being specifically requested by the user. Thus, for example, if a user views a poster related to travel to Paris in the front window of a travel agency, the user may be prompted with a recommendations such as "Vacation packages to Paris start at $1200, would you like to book now?"

After the user is presented with the travel recommendation, block 414 waits for a user action request, e.g., via a voice command, and if no user action is requested within a period of time, control passes to block 416 to hide the travel recommendation and return control to block 402. If a user action is received, however, control passes to block 418 to handle the user action, prior to returning control to block 402. Any of the user actions discussed above in connection with FIGS. 3-9 may also be used in this embodiment.

As such, in this embodiment, the visual booking system may effectively anticipate what could be a desired travel destination location for the user before the user even consciously recognizes that he or she might like to travel to that location.

It will be appreciated that in different embodiments, the activities associated with a visual booking operation may be allocated differently between blocks 402, 408 and 412, e.g., so that visual element extraction and inference may be performed during monitoring in block 402, or some of the operations associated with monitoring the steam may be deferred until block 408. In addition, for example, it may be desirable to generate travel recommendations in block 408 rather than block 412 and then store those travel recommendations when in the on-demand mode such that, even if the user is not presented with those travel recommendations, those travel recommendations are nonetheless stored for future targeted advertisements or for other marketing and/or business intelligence purposes. Other modifications will be apparent to one of ordinary skill in the art having the benefit of the instant disclosure.

Background Suggestion Process Engine Based on Visual Bookmarks

In other embodiments consistent with the invention, visual booking operations may be performed as background operations for digital images at times other than when they are initially captured by a user, and for the purpose of identifying "visual bookmarks" for travel offers. In this regard, a visual bookmark is considered to be a digital image that a user has captured with the intention of recalling a travel offer that is the subject of the digital image. For example, a user may be walking in a shopping center and walk past a travel agency, and may see a poster related to travel to a particular destination location for a particular price. The user may decide to snap a picture of the poster for later recall, in a similar manner to the way in which individuals take pictures of items or places to remember things to buy, things to watch later, things to post on a social media site or visual discovery tool (e.g., Pinterest), etc. Embodiments of the invention may analyze such digital images to locate travel offers associated with the images, including potentially travel offers that are the subjects of such images, as well as potentially competing offers by other travel-related entities.

In one embodiment, for example, a travel product may be suggested to a user by analyzing digital images captured by a user device, e.g., a wearable device, a mobile device, a digital camera, or practically any other device having image capture functionality, to attempt to identify at least one digital image that has been captured as a visual bookmark for a travel offer. The analysis may include analyzing visual elements in a digital image to identify a travel destination location that is geographically remote from a location at which such digital image is captured, and in response to identifying a digital image, a travel database may be searched to identify the travel offer such that a travel recommendation associated with the travel offer may be presented to the user.

A background suggestion process may be utilized for digital images captured locally on a device and/or for digital images stored in a networked storage environment, e.g., within a cloud storage service, including, for example, a photo sharing service. For example, a user may authorize a visual booking system to obtain access to the user's digital images in the cloud storage service for background analysis. In addition, digital images may be taken of marketing materials displayed in a physical location, as well as digital images taken of magazines, brochures, printed advertisements, television commercials, web pages, etc.

Figure 11:
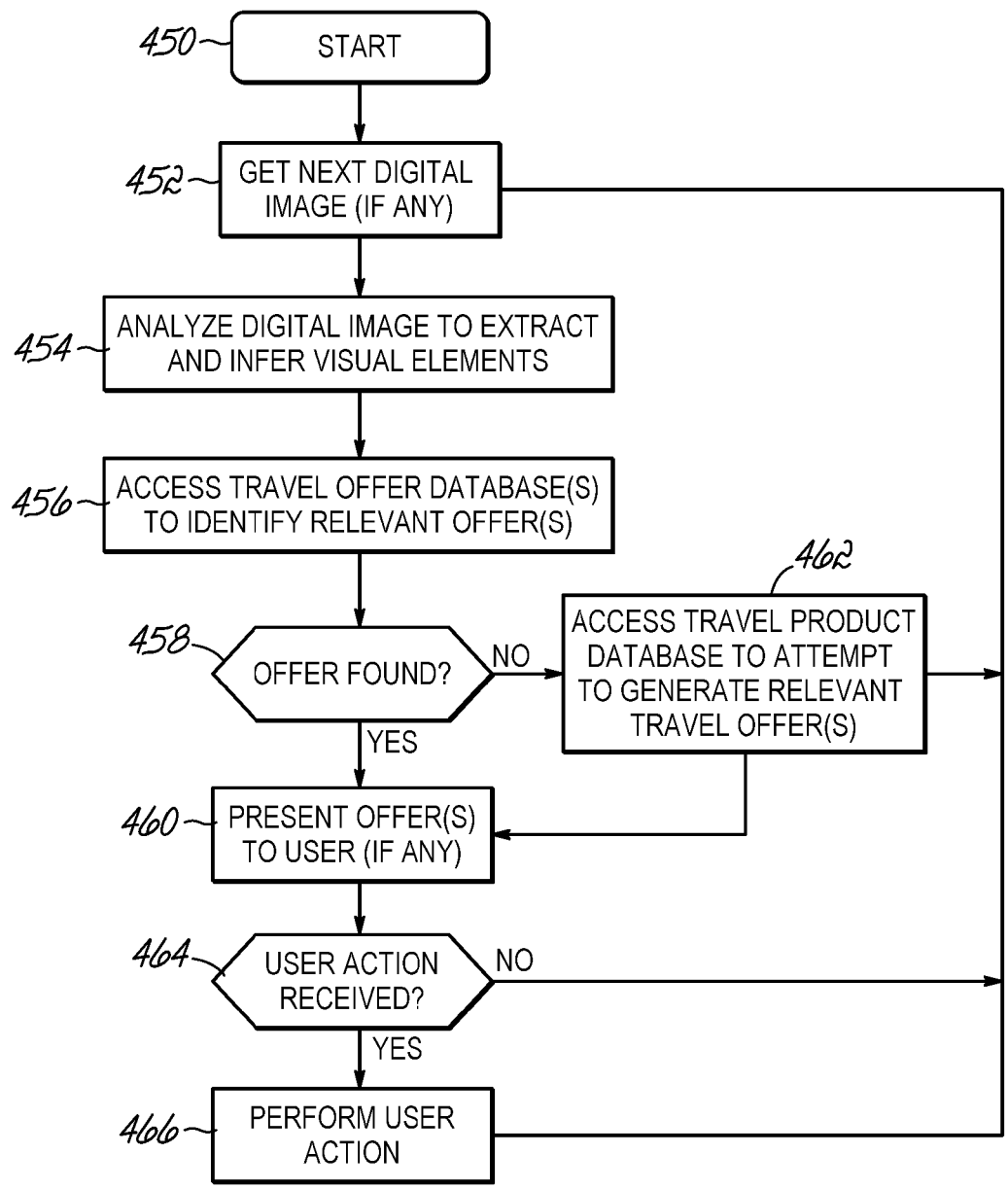
FIG. 11 is a flowchart illustrating an example sequence of operations for performing a visual bookmark suggestion operation in the system of FIGS. 1-2.

FIG. 11, for example, illustrates a routine 450 that may be executed, for example, to process images stored locally in a mobile device or images stored in a cloud service, and running as a background process. In some embodiments, at least a portion of routine 450 may be implemented in an application running on a mobile device, with another portion running on a server, e.g., of a visual booking system. For example, analysis of digital images may be performed by an image analysis service executing on a server, with a local application on a device uploading or forwarding images to the image analysis service on a periodic basis. The server may store the digital images, for example, in a travel offer photos database, or in another data store, and in some embodiments, the analysis results, including the offers associated with the image, may also be stored in the travel offer photos database. The local application may also be used in connection with the visual booking operations discussed above, or may be implemented in a different application, e.g., a different travel-related application. On the other hand, in embodiments that process images stored in a cloud storage service, most or all of the activities mentioned herein may be performed predominantly in one or more server computers.

Therefore, routine 450 begins in block 452 by selecting a next unprocessed digital image stored in a device or cloud storage service. Block 454 then analyzes the digital image to extract and infer visual elements, e.g., using the various techniques discussed above in connection with FIGS. 3-9, as well as potentially other information associated with the digital image. For example, in some embodiments, the geolocation of a physical travel agency at which a digital image is taken may be ascertained based upon EXIF data providing GPS coordinates for the image. In addition, visual elements may be detected as incorporating a particular travel provider or travel agency logo, or even incorporating QR or barcodes providing web links to a travel-related entity or even to a particular offer. In addition, if an assumption is made that the visual scene represents a travel offer, then OCR analysis may extract additional non-location visual elements, e.g., the content of an offer (flight, flight+hotel, hotel), the offer duration (e.g. "one week") and the starting price ("from $1300 per person"). Consequently, in some embodiments, a travel booking system may be able extract not only a travel destination location, but also additional information such as travel dates, trip duration, starting price and a travel agency proposing an offer.

Next, in block 456, one or more travel offer databases may be accessed to attempt to identify one or more relevant travel offers. The travel offer databases may be associated with multiple travel-related entities, or may be dedicated to specific travel-related entities, e.g., so that specific travel-related entities such as travel providers or travel agencies can individually manage the travel offers they wish to present to potential customers. In some embodiments, the travel offer databases may be searched to attempt to locate the exact travel offer that is the subject of a visual bookmark, e.g., if a travel agency poster that is the subject of a digital image describes a specific offer. In other embodiments, an exact travel offer may be searched, and additional, competing offers may also be searched to present the user with other competitive options. Block 458 then determines if any matching offers were found, and if so, passes control to block 460 to present any found offer(s) to the user, e.g., in the form of travel recommendations. If not, block 458 passes control to block 462 to access a travel product database (e.g., an open flight search database) to generate an offer (e.g., based on a new travel recommendation) for the customer in a similar manner to the embodiment of FIGS. 3-9, prior to presenting that offer to the user as a travel recommendation in block 460.

Next, in block 464, a user may be permitted to initiate any of the various user actions discussed above, e.g., to complete a booking, bookmark the offer, purchase an option, or perform further searching. If no action is initiated, block 464 returns control to block 452, otherwise, control passes to block 466 to perform the requested user action, and control then returns to block 452.

It will be appreciated that the presentation of offers to the user may not occur instantaneously in some embodiments. Furthermore, offers may be presented in various audio and/or visual manners. For example, offers may be presented in a local application on a mobile device, on a wearable device, or may be presented via text message, email, telephone calls, or even physical mailings. Users may also be directed to web sites or portals, including those of any travel-related entities associated with particular travel offers.

As such, in contrast to the other embodiments discussed herein, the visual bookmarking embodiments leverage digital images that were consciously taken by a user (using his or her mobile phone or wearable device) for a bookmarking purpose. In many cases, a user will be stopped in front of a traditional travel agency (which may be closed or crowded), or viewing a magazine, and the user will take a snapshot of a poster or the magazine for further reading, or to remember the offer.

In addition, in some embodiments, a travel-related entity such as a travel agency may be notified of any travel offers bookmarked by users, or users may be automatically directed to a travel agency web site to complete a booking for a particular offer. For example, product information associated with a travel offer may be provided to at least one competing travel-related entity to facilitate the generation of a targeted competing travel offer to the user by the competing travel-related entity. Additional user actions that may be taken include accessing a list of bookmarked offers via a dedicated portal or application, clicking on a URL directed to a selected offer, clicking on a URL targeting a partner website with a similar offer. In addition, one or more travel-related entities may push targeted offers to users based upon information collected from visual bookmarks.

Figure 12:
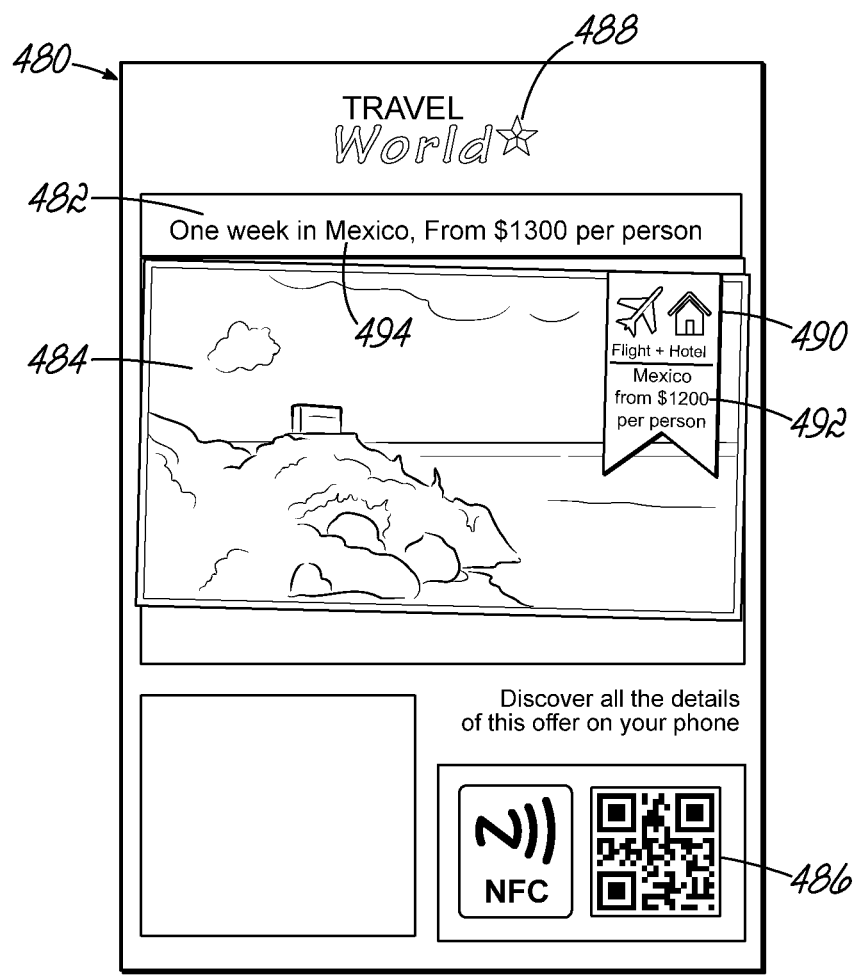
FIG. 12 is a graphical view of an example poster directed to a travel offer capable of being analyzed using the flowchart of FIG. 11.

As an example, FIG. 12 illustrates an example poster 480 that may be visually bookmarked by a user, e.g., when the poster is displayed in the front window of a travel agency. The visual booking system may extract a number of types of information about the offer that is the subject of the poster. For example, an offer duration 482 may be determined ("One week"), and an image element 484 may be used to infer to travel destination location for the offer, in a similar manner to the embodiment of FIGS. 3-9. A QR code 486 may be used to obtain a link to the offer, and a travel-related entity logo 488 may be used to identify, via image matching, OCR, and/or GPS data for the image, a travel-related entity associated with the offer. Travel product types 490 ("Flight+Hotel") may be inferred, as may an offer price 492 ("from $1300 per person"). In addition, a travel destination location 494 ("Mexico") may be inferred from OCR analysis.

Other modifications may be made without departing from the spirit and scope of the invention. Therefore, the invention lies in the claims hereinafter appended.

What is claimed is:

1. A method of determining potential travel destinations for consideration by a user, the method comprising:

receiving, by a computer, a digital image from an image capture device of the user, wherein the digital image is representative of a point of view of the user who is situated in a current location, the digital image includes a plurality of visual elements that are each associated with a corresponding candidate travel destination location, and each candidate travel destination location represents a point of interest indicative of a particular geographical location at a given level of geographical hierarchy;

analyzing, by the computer, the plurality of visual elements in the digital image to identify the candidate travel destination location corresponding to each visual element, wherein analyzing the plurality of visual elements includes:

extracting the plurality of visual elements from the digital image;

extracting inferred data from each of the plurality of visual elements, wherein the inferred data indicates the candidate travel destination locations associated with each of the plurality of visual elements;

identifying the candidate travel destination location for each visual element based on the inferred data; and creating a plurality of remote candidate travel destination locations, and in response to identifying a particular candidate travel destination location that is indicative of the current location of the user, omitting the particular candidate travel destination location from the plurality of remote candidate travel destination locations;

forwarding, by the computer, the plurality of remote candidate travel destination locations to a display; and causing the plurality of remote candidate travel destinations to be presented to the user.

2. The method of claim 1, wherein receiving the digital image comprises:
receiving the digital image from a wearable image capture device worn by the user.

3. The method of claim 2, wherein the wearable image capture device includes a pair of smart glasses or a smart watch.

4. The method of claim 1, wherein receiving the digital image comprises:
receiving the digital image from a handheld image capture device of the user.

5. The method of claim 1, wherein analyzing the plurality of visual elements in the digital image comprises;
performing optical character recognition on at least one visual element among the plurality of visual elements to identify at least one text element.

6. The method claim 5, wherein analyzing the plurality of visual elements in the digital image further comprises:
classifying the text element as a location element or a non-location element based upon a database of points of interest.

7. The method of claim 6, wherein analyzing the plurality of visual elements in the digital image further comprises:
classifying the text element as a date element or an event element in response to classifying the text element as a non-location element, and wherein searching the travel database includes specifying a date parameter for the search based upon the text element.

8. The method of claim 1, wherein analyzing the plurality of visual elements in the digital image comprises:
performing image analysis on at least one visual element among the plurality of visual elements to identify the candidate travel destination location.

9. The method of claim 8, further comprising:
logically-linking multiple visual elements among the plurality of visual elements based upon proximity of the multiple visual elements in the digital image.

10. The method of claim 8, further comprising:
weighting the unique travel destination-candidate travel destination location-based upon proximity of the at least one visual element to the point of view of the user.

11. The method of claim 8, further comprising:
weighting the candidate travel destination location based upon a comparison of a surface for the at least one visual element with a global surface for the digital image.

12. The method of claim 8, further comprising:
weighting the candidate travel destination location based upon cross-referencing between multiple visual elements among the plurality of visual elements.

13. The method of claim 8, further comprising:
weighting the candidate travel destination location based upon a geographical hierarchy.

14. The method of claim 8, wherein analyzing the plurality of visual elements in the digital image comprises:
ranking the plurality of candidate travel destination location; and
selecting an identified travel destination location based upon the ranking of the plurality of candidate travel destination locations.

15. The method of claim 8, wherein generating the candidate travel destination location comprises:
combining weights associated with multiple visual elements from among the plurality of visual elements that are determined to be associated with the candidate travel destination location.

16. The method of claim 1, wherein the current location is proximate a home location of the use.

17. The method of claim 1, further comprising:
searching a travel database to identify at least one travel product associated with one of the plurality of remote candidate travel destinations,
wherein searching the travel database generates a search result identifying the at least one travel product and a cost thereof, and
wherein the method fuither comprises:
presenting the search result to the user.

18. The method of claim 17, further comprising:
receiving user input from the user after presenting the search result to the user; and
in response to receiving the user input, completing a booking for the at least one travel product, bookmarking the search result, booking an option to later book the at least one travel product, or presenting location information for a nearby travel agency at which the user can book the at least one travel product.

19. The method of claim 17, wherein presenting the search result to the user is performed on a wearable image capture device with which the digital image is captured, and further comprising:
interacting with the user on a separate handheld computing device after presenting the search result on the wearable image capture device to complete a booking for the at least one travel product.

20. The method of claim 1, further comprising:
storing information associated with the digital image, the at least one travel product, and analysis results generated from analyzing the plurality of visual elements in a database; and
targeting an advertisement based upon the stored information.

21. The method of claim 1, wherein the digital image is received from a stream of digital images captured by a wearable device of the user, wherein analyzing the plurality of visual elements and searching a travel database to identify at least one travel product are performed on a substantially continuous basis, and further comprising:
causing the wearable image capture device to present an unsolicited recommendation associated with the at least one travel product to the user.

22. The method of claim 21 further comprising:
switching the wearable image capture device between a continuous mode and an on-demand mode in response to user input.

23. The method of claim 22, wherein analyzing the plurality of visual elements, searching the travel database and causing the wearable image capture device to present the product information are performed absent user input when the wearable image capture device is in the continuous mode, and further comprising:

analyzing visual elements in digital images from the stream of digital elements when the wearable image capture device is in the on-demand mode.

24. The method of claim 1, further comprising:
searching a travel database to identify at least one travel product associated with one of the plurality of remote candidate travel destinations, wherein the travel product includes at least one flight.

25. The method of claim 24, wherein searching the travel database to identify at least one travel product futher comprises:
identifying at least one travel product associated with the one of the plurality of remote candidate travel destinations.

26. The method of claim 1, wherein the digital image is captured as a visual bookmark for a travel offer, and further comprising:
identifying the travel offer based upon analyzing the plurality of visual elements in the digital image.

27. A method of suggesting a travel product to a user, the method comprising:
receiving digital images from a stream of digital images captured by a wearable image capture device while being worn by the user, wherein the stream of digital images are representative of a point of view of the user situated in a current location, and wherein the stream of digital images include a plurality of visual elements that are each associated with a candidate travel destination location and each candidate travel destination location represents a point of interest indicative of a particular geographical location at a given level of geographical hierarchy;
analyzing a plurality of visual elements in at least one of the received digital images by:
extracting the plurality of visual elements from the received digital image;
extracting inferred data from each of the plurality visual elements, wherein the inferred data indicates the candidate travel destination locations associated with each of the plurality of visual elements;
identifying the candidate travel destination location for each visual element based on the inferred data; and
creating a plurality of remote candidate travel destination locations, and in response to identifying a particular candidate travel destination location that is indicative of the current location of the user, omitting the particular candidate travel destination location from the plurality of remote candidate travel destination locations;
searching a travel database to identify at least one travel product for travel to each of the plurality of remote candidate travel destination locations; and
causing the wearable image capture device to present an unsolicited recommendation associated with the at least one travel product for each of the plurality of remote candidate travel destination locations to the user.

28. A method of suggesting a travel product to a user, the method comprising:
receiving digital images from a stream of digital images captured by a wearable image capture device while being worn by the user, wherein the wearable image capture device is switchable between continuous and on-demand modes, the stream of digital images is representative of a point of view of the user situated in a current location, the stream of digital images include a plurality of visual elements that are each associated with a candidate travel destination location, and each candidate travel destination location represents a point of interest indicative of a particular geographical location at a given level of geographical hierarchy;
analyzing visual elements in at least one of the received digital images from the stream by:
extracting the plurality of visual elements from the received digital image;
extracting inferred data from each of the plurality of visual elements, wherein the inferred data indicates the candidate travel destination locations associated with each of the plurality of visual elements;
identifying the candidate travel destination location for each visual element based on the inferred data; and
creating a plurality of remote candidate travel destination locations, and in response to identifying a particular candidate travel destination location that is indicative of the current location of the user, omitting the particular candidate travel destination location from the plurality of remote candidate travel destination locations:
searching a travel database to identify at least one travel product for travel to each of the plurality of remote candidate travel destination locations; and
causing the wearable image capture device to present a travel recommendation associated with each of the plurality of remote candidate travel destination locations to the user,
wherein when the wearable image capture device is in the on-demand mode, the travel recommendation is presented only at user request, and
wherein when the wearable image capture device is in the continuous mode,the travel recommendation is an unsolicited recommendation.

29. A method of searching for a travel offer for a user, the method comprising:
receiving a plurality of digital images from a wearable user device, wherein the plurality of digital images are representative of a point of view of a current location of the user and include a plurality of visual elements that are each associated with a candidate travel destination location, and each candidate travel destination location represents a point of interest indicative of a particular geographical location at a given level of geographical hierarchy; and
analyzing at least one digital image of the plurality of digital images to identify the candidate travel destination location corresponding to each visual element, wherein analyzing the plurality of visual elements includes:
extracting the plurality of visual elements from the at least one digital image;
extracting inferred data from each of the plurality of visual elements, wherein the inferred data indicates the candidate travel destination locations associated with each of the plurality of visual elements;
identifying the candidate travel destination location for each visual element based on the inferred data; and
creating a plurality of remote candidate travel destination locations, and in response to identifying a particular candidate travel destination location that is indicative of the current location of the user, omitting the particular candidate travel destination location from the plurality of remote candidate travel destination locations:
searching a database to identify a plurality of travel offers that each correspond to one of the plurality of remote candidate travel destination locations based upon analyzing the plurality of visual elements in the identified digital image; and causing a travel recommendation associated with the plurality of remote candidate travel destination locations to be presented to the user.

* * * * *

UNITED STATES PATENT AND TRADEMARK OFFICE
CERTIFICATE OF CORRECTION

PATENT NO.        : 9,830,561 B2
APPLICATION NO.   : 14/266122
DATED             : November 28, 2017
INVENTOR(S)       : David Renaudie Page 1 of 1

It is certified that error appears in the above-identified patent and that said Letters Patent is hereby corrected as shown below:

In the Claims

Column 28, Claim 16, Line 15, change "use" to --user--

Column 28, Claim 17, Line 23, change "fuither" to --further--

Column 29, Claim 27, Line 37, after "plurality", insert --of--

Signed and Sealed this
Twentieth Day of February, 2018

Andrei Iancu
*Director of the United States Patent and Trademark Office*